US012613218B2

(12) United States Patent
Shuhendler et al.

(10) Patent No.: US 12,613,218 B2
(45) Date of Patent: Apr. 28, 2026

(54) DEVICES AND METHODS FOR SELECTIVE DETECTION OF CANNABINOIDS

(71) Applicant: University of Ottawa, Ottawa (CA)

(72) Inventors: Adam Shuhendler, Ottawa (CA); Benoit Lessard, Ottawa (CA); Cory Harris, Gatineau (CA); Zachary John Comeau, Ottawa (CA); Nicholas Tyler Boileau, Ottawa (CA)

(73) Assignee: University of Ottawa, Ottawa (CA)

( * ) Notice: Subject to any disclaimer, the term of this patent is extended or adjusted under 35 U.S.C. 154(b) by 563 days.

(21) Appl. No.: 17/610,986

(22) PCT Filed: May 14, 2020

(86) PCT No.: PCT/CA2020/050652
§ 371 (c)(1),
(2) Date: Nov. 12, 2021

(87) PCT Pub. No.: WO2020/232532
PCT Pub. Date: Nov. 26, 2020

(65) Prior Publication Data
US 2022/0221422 A1 Jul. 14, 2022

Related U.S. Application Data

(60) Provisional application No. 62/849,340, filed on May 17, 2019.

(51) Int. Cl.
*G01N 27/414* (2006.01)
(52) U.S. Cl.
CPC ................................. *G01N 27/4148* (2013.01)
(58) Field of Classification Search
CPC combination set(s) only.
See application file for complete search history.

(56) References Cited

U.S. PATENT DOCUMENTS 9,709,582 B1 * 7/2017 Gordon ................ G01N 33/582
11,187,711 B1 * 11/2021 Lynn .................... G01N 33/948
(Continued)

FOREIGN PATENT DOCUMENTS

CN 103235022 A 8/2013
FR 3043209 A1 5/2017
WO 2018200794 A1 11/2018

OTHER PUBLICATIONS

Martin et al., "Influence of the supramolecular arrangement of iron phthalocyanine thin films on catecholamine oxidation". Journal of Electroanalytical Chemistry, Mar. 1, 2019 (Mar. 1, 2019), vol. 836, pp. 7-15 (Year: 2019).*

(Continued)

*Primary Examiner* — Sue A Purvis
*Assistant Examiner* — Seyon Ali-Simah Punchbeddell
(74) *Attorney, Agent, or Firm* — Brion Raffoul

(57) ABSTRACT

Systems, devices, and methods for detecting cannabinoids in liquid or gaseous samples. In one aspect, the present invention uses a sensor element and two electrical circuit elements. When the sensor element is in contact with a sample containing cannabinoid, interactions between the sensor element and the cannabinoid changes or affects the sensor element's electrochemical properties. Using the two electrical circuit elements, this change can be detected. An analog signal relating to the changed electrochemical properties can be measured using the two electrical circuit elements. In one implementation, there is provided an organic field effect transistor (OFET) whose signal changes when in contact with a cannabinoid containing sample.

18 Claims, 24 Drawing Sheets

(56)                References Cited

U.S. PATENT DOCUMENTS

| | | | | |
|---|---|---|---|---|
| 2007/0102292 | A1* | 5/2007 | Dreibholz | G01N 27/3274 |
| | | | | 204/401 |
| 2010/0194409 | A1* | 8/2010 | Gao | C12Q 1/6825 |
| | | | | 324/693 |
| 2018/0128843 | A1* | 5/2018 | Lucas | G01N 33/523 |
| 2020/0093429 | A1* | 3/2020 | Star | B82Y 15/00 |

OTHER PUBLICATIONS

Bora, M., Schut, D., and Baldo, M.A., "Combinatorial Detection of Volatile Organic Compounds Using Metal-Phthalocyanine Field Effect Transistors", Analytical Chemistry, 2007, Mar. 31, 2007, 6 pages, vol. 79, No. 9, pp. 3298-3303, US. doi: 10.1021/ac061904r (Year: 2007).*

Bora, M., Schut, D., and Baldo, M.A., "Combinatorial Detection of Volatile Organic Compounds Using Metal-Phthalocyanine Field Effect Transistors", Analytical Chemistry, 2007, Mar. 31, 2007, 6 pages, vol. 79, No. 9, pp. 3298-3303, US. doi: 10.1021/ac061904r.

Wanklyn, Ceri et al. "Disposable screen printed sensor for the electrochemical detection of delta-9-tetrahydrocannabinol in undiluted saliva", Chemistry Central Journal, Jan. 21, 2016, 10 pages, vol. 10, No. 1. doi: 10.1186/s13065-016-0148-1.

Extended European Search Report mailed May 9, 2023, on corresponding European Patent App. No. 20809949.0. 10 pages.

Martin CS, Alessio P, Cresipilho FN, Brett CMA, Contstantino CJL. Influence of the supramolecular arrangement of iron phthalocyanine thin films on catecholamine oxidation. Journal of Electroanalytical Chemistry. Mar. 1, 2019;836,7-15. doi: 10.1016/j.ejelechem.2019. 01.029.

Wanklyn C, Burton D, Enston E, Bartlett CA, Taylor S, . . . Murphy L. Disposable screen printed sensor for the electrochemical detection of delta-9-tetrahydrocannabinol in undiluted saliva. Chemistry Central Journal. Jan. 21, 2016;10:1. doi: 10.1186/s13065-016-0148-1.

De Faubert Maunder MJ. An improved procedure for the field testing of cannabis. United Nations Office of Drugs and Crime Bulletin on Narcotics. Jan. 1, 1974;19-26.

Martin et al., "Influence of the supramolecular arrangement of iron phthalocyanine thin films on catecholamine oxidation", Journal of Electroanalytical Chemistry, Mar. 1, 2019 (available online Mar. 1, 2019 at https://doi.org/10.1016/j.jelechem.2019.01.029), vol. 836 (2019) pp. 7-15.

Balbino MA, de Menezes MM, Eleotério IC, Saczk AA, Okumura LL, Tristão HM, de Oliveira MF. Voltammetric determination of Δ9-THC in glassy carbon electrode: An important contribution to forensic electroanalysis. Forensic Sci Int. Sep. 10, 2012;221(1-3):29-32. doi: 10.1016/j.forsciint.2012.03.020. Epub Apr. 21, 2012. 4 pages.

* cited by examiner

A. Plant Sample 1

B. Plant Sample 2 a. FePc+ THC–FBBB(B)    b. ts-CuPc+THC–FBBB(B)    c. tbt-CuPc+THC–FBBB(B)    d. AlClPc+THC–FBBB(B)

DEVICES AND METHODS FOR SELECTIVE DETECTION OF CANNABINOIDS

This application is a 35 U.S.C. 371 national stage filing and claims priority to International Application No. PCT/ CA2020/050652 filed on May 14, 2020, entitled DEVICES AND METHODS FOR SELECTIVE DETECTION OF CANNABINOIDS which claims the benefit of U.S. Provisional Application No. 62/849,340 filed on May 17, 2019 each of which are incorporated herein by reference in their entirety.

TECHNICAL FIELD

The present invention relates to chemical detection. More specifically, the present invention relates to electrochemical sensors and methods for detecting of specific chemicals in samples.

BACKGROUND

In October 2018, Canada legalized recreational *cannabis* use, the second country to do so after Uruguay in 2012, and thereby leading a global trend towards *cannabis* legalization around the world. *Cannabis* is now legally available for recreational and/or medicinal use, in some cases with limitations, restrictions and government control, in over 40 countries worldwide with others in the process of legalizing or decriminalizing possession. In addition to the established and emerging therapeutic potential of medical *cannabis* products, the regulated production and sale of recreational *cannabis* significantly increases tax revenues, reduces taxes spent on prohibition enforcement, reduces incarceration rates, and reduces black market revenues.

While the plant, *Cannabis sativa*, a member of the Cannabaceae family, is also used for fiber and seed/oil (hemp), the drug-like properties are generally associated with the plant's inflorescence that contains a variety of unique cannabinoids, often in high concentrations. Cannabinoids are produced by the plant as carboxylic acids that may be decarboxylated into their more pharmacologically active homologues by exposure to heat, light, or prolonged storage. Among more than 100 identified cannabinoids, tetrahydrocannabinol (THC) and cannabidiol (CBD), the decarboxylated forms of tetrahydrocannabinolic acid (THCa) and cannabidiolic acid (CBDa), are the most abundant. Due to their psychoactive and therapeutic effects, these compounds are also the most sought after by consumers.

Two G-protein coupled cannabinoid receptors ($CB_1$ and $CB_2$) have so far been identified, the former is expressed highly in the brain with lower expression in peripheral tissues while the latter is expressed predominantly in immune and hematopoietic systems. The psychogenic effects of THC may be attributed to engagement with $CB_1$, making THC recreationally useful, but challenging as a therapeutic agent. CBD is non-psychoactive and does not activate $CB_1$ and $CB_2$. As such, CBD provides a variety of clinically validated and experimental indications for therapeutic use. For safety and efficacy reasons, as well as quality control and law enforcement, knowing the THC and CBD content of *cannabis* and related products is of great interest to consumers, industry, and regulators. Moreover, in Canada, quality assurance regulations require that all commercial *cannabis* products be tested and labelled for THC and CBD content. Currently, the most common and accurate methods of measuring cannabinoids employ high pressure liquid or gas chromatography (HPLC or GC). However, for many companies and most consumers with limited resources and expertise, these instruments are not an accessible option. Fee-for-service cannabinoid testing is increasingly available but expensive and may be delayed by shipping or backlogs. Law enforcement officials have similarly struggled with establishing a definitive analytical field method to detect *cannabis* and *cannabis* impairment. Recently, smaller GC and Fourier-transform near-infrared technologies have been developed as alternatives but there is a present and growing need for rapid, on-the-spot, and low-cost differentiation of cannabinoids.

Organic field effect transistors (OFETs) have shown promise as low-cost, disposable, and mechanically robust sensors. Generally speaking, OFET devices are operated by applying a voltage to a gate electrode ($V_{GS}$) while measuring the voltage ($V_{SD}$) and current ($I_{SD}$) differential between the source and drain electrodes. At the threshold voltage ($V_T$), the semiconductor layer is populated with sufficient carriers to "switch on", and the $I_{DS}$ rapidly increases until reaching saturation. The field-effect mobility ($\mu$) describes how easily charge carriers may move within the active layer, i.e. the semiconducting layer, and is extracted by current-voltage measurements. Molecular structure, frontier orbital energies, film crystallinity, device engineering, and characterization environment will all have a significant effect on the OFET device performance as quantified by $\mu$ and $V_T$. Importantly, n-type semiconductors move electrons while p-type semiconductors move holes as majority charge carriers, with a rate related to $\mu$ and $V_{GS}$. One of the most commonly employed classes of small molecule semiconductors utilized in OFETs is metal phthalocyanine derivatives. Copper phthalocyanine (CuPc), a p-type semiconductor, and hexadecafluorophthalocyanine ($F_{16}$-CuPc), an n-type semiconductor, are well established materials for OFET applications due to their thermal and chemical stability and ease of synthesis. To date, OFETs have been developed for the detection of a variety of medically-relevant fluid-based analytes and environmental gases, with selectivity being attained by assembling multiple sensors into an array. The application of OFETs for detection, differentiation and quantification of *cannabis* components, or from any crude extract from medicinal or psychoactive plant, is unprecedented.

Small molecules, such as diazonium salts, have also been reported for cannabinoid detection, most of which are chromogenic in nature. Fast blue BB (4-amino-2,5-diethoxybenzanilide diazotated zinc double salt, or FBBB) has emerged as the most well-characterized molecular indicator, undergoing covalent modification by cannabinoids under alkaline conditions to afford a rapid colorimetric mechanism for detecting THC. Sensors employing FBBB are still in use by law enforcement agencies in South America. The very high limit of detection and rapid rate of reaction of FBBB with cannabinoids is ideally suited as a cursory sampling tool. However, the method in its optical form is limited by its lack of specificity.

In view of the above drawbacks of current technologies, there is a need for improved methods and devices for the detection of cannabinoids, differentiation therebetween, and quantitative measurements in liquid or gaseous samples. There is a need for small, rapid, and cost-effective devices for performing these functions. Methods for selective detection and accurate quantification of cannabinoids are also highly desirable.

SUMMARY

The present invention provides systems, devices, and methods for detecting cannabinoids in liquid or gaseous samples. In one aspect, the present invention uses a sensor element and two electrical circuit elements. When the sensor element is in contact with a sample containing a cannabinoid, interactions between the sensor element and the cannabinoid changes or affects the sensor element's electrochemical properties. Using the two electrical circuit elements, this change can be detected. An analog signal relating to the changed electrochemical properties can be measured using the two electrical circuit elements. In one implementation, there is provided an organic field effect transistor (OFET) whose signal changes when in contact with a cannabinoid containing sample.

In a first aspect, the present invention provides a system for determining a presence of a substance in a sample, the system comprising:
a first electrical circuit element;
a second electrical circuit element;
a sensor element between said first electrical circuit element and said second electrical circuit element, said sensor element being for contacting said sample;
wherein when said sensor element is in contact with said substance, interactions between said sensor element and said substance affects at least one electrochemical property of said sensor element.

In another aspect, the present invention provides a device for detecting at least one cannabinoid in a sample, the device comprising:
an electrochemical sensor including;
a gate layer;
a dielectric layer;
a source electrode, a drain electrode and an organic semiconducting layer,
wherein the organic semiconductor layer is provided between the source electrode and the drain electrode for providing a current pathway therebetween;
wherein the organic semiconducting layer is modified with a probe;
a voltage source electrically coupled to the gate layer and the source electrode; and
processing means for measuring current flow and detecting a current level indicative of cannabinoid presence and/or levels thereof in the sample.

In yet a further aspect, the present invention provides a method for determining a presence of a cannabinoid in a sample, the method comprising:
a) contacting said sample with a sensor element;
b) measuring an analog signal, said analog signal being indicative of one or more electrochemical properties of said sensor element;
c) determining that at least one cannabinoid is present in said sample if said analog signal indicates a change in said electrochemical properties of said sensor element;
wherein when said cannabinoid is in contact with said sensor element, said electrochemical properties of said sensor element are affected by interactions between said cannabinoid and said sensor element.

BRIEF DESCRIPTION OF THE DRAWINGS

The present invention will now be described by reference to the following figures, in which identical reference numerals refer to identical elements and in which:

FIG. 3A shows output curves for CuPc devices, FIG. 3B shows output curves for $F_{16}$-CuPc devices: with (i) semiconductor-only device, (ii) FBBB probe layer, (iii) FBBB probe layer and where FIG. 3C is a graph of transfer curves for CuPc devices, with FIG. 3D being a graph of transfer curves for $F_{16}$-CuPc devices;

FIG. 6A shows graphs for a CuPc device treated with FBBB and FIG. 6B shows graphs for a $F_{16}$-CuPc device treated with FBBB, for samples containing (i) ratios of THC to CBD, (ii) pure THCa or pure CBDa;

FIG. 7A is a graph for plant sample 2 and FIG. 7B is a graph for plant sample 1;

FIG. 8A is for plant sample 1 and FIG. 8B is for plant sample 2 with: (i) CuPc device treated with FBBB, (ii) $F_{16}$-CuPc device treated with FBBB, (iii) normalized intensity HPLC-DAD chromatograms;

FIG. 10A shows a graph of adjusted mobilities for a CuPc device treated with FBBB, FIG. 10B shows a graph of adjusted mobilities for a $F_{16}$-CuPc device treated with FBBB, and FIG. 10C is a graph of average current at constant gate-source/source-drain voltages for CuPc and $F_{16}$-CuPc devices;

FIG. 11A shows a graph of normalized absorbance and cyclic voltammogram for a CuPc device and FIG. 11B shows a graph of normalized absorbance and cyclic voltammogram for a $F_{16}$-CuPc device;

DETAILED DESCRIPTION

Figure 1A:
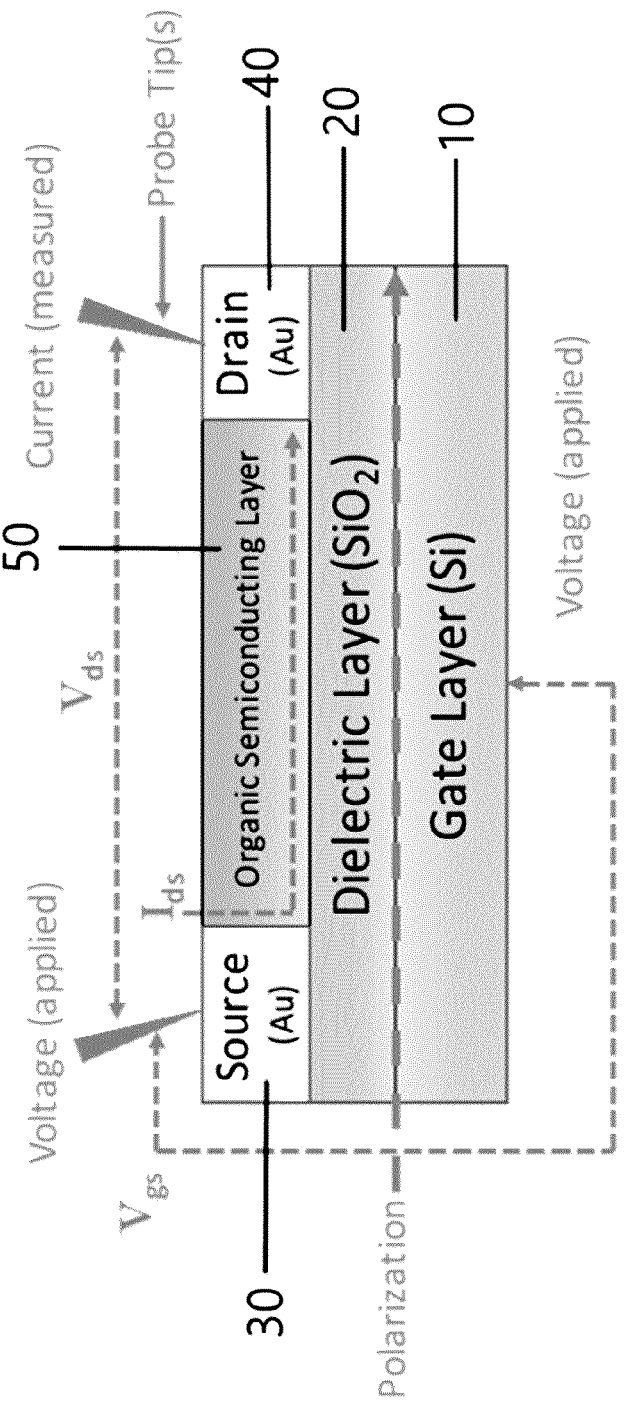
FIG. 1A is a cross section schematic representation of an organic field effect transistor (OFET) of the bottom gate bottom contact configuration as used within the present invention.

In one aspect, the present invention relates to systems and methods for the detection and sensing of cannabinoids. It has been found that the interaction of cannabinoids with a number of organic semiconductors changes the electrochemical properties of these semiconductors. These organic semiconductors can thus be used to sense the presence of such cannabinoids in samples. By contacting the semiconductor with a sample, if the sample contains cannabinoids, the electrochemical properties of the semiconductor will be affected. This change in electrochemical properties can be detected by various means. In some implementations, a sensor element is used for contacting with a sample and, if the sample contains cannabinoids, the sensor element's electrochemical properties are affected. The affected electrochemical properties of the sensor element are sensed, or the effect of the affected electrochemical properties are used to determine whether the sample has cannabinoids or not. As an example, the sensor element may be the semiconductor that is placed between two electrical circuit elements. Changed electrochemical properties of the semiconductor due to being in contact with cannabinoids in a sample would affect a current passing between the two circuit elements or would affect a voltage between the two circuit elements. As well, in other implementations, the changed electrochemical properties would affect an impedance, resistance, or a capacitance between these two circuit elements. Accordingly, the present invention includes systems and devices that incorporate a suitable sensor element that, when in contact with cannabinoids in a sample, changes its electrochemical properties and where the sensor element's changed electrochemical properties are detected or sensed by measuring a current, voltage, impedance, capacitance, resistance, or any other electrical property or value in a circuit that incorporates the sensor element. Experiments have shown that a number of suitable materials may be used as the sensor element, including a number of phthalocyanine based materials such as CuPc, $F_{16}$CuPc, FePc, AlClPc, ts-CuPc, $H_2Pc$, CoPc, and tbt-CuPc. Such materials have been shown to have their electrochemical properties affected when in contact with cannabinoids such as THC, THCa, CBD, CBDa, and mixtures thereof. The interactions between the sensor material and the cannabinoids cause the changes in the electrochemical properties of the sensor material and, as such, this change in properties can be used in resistive, impedimetric, voltammetric, spectroelectrochemical, potentiometric, or amperometric systems. These and other aspects and implementations of the various other aspects of the present invention are discussed below.

In one specific implementation, the present invention integrates the rapid chemical sensing of cannabinoids by diazonium salts under alkaline conditions into OFET devices. The device of the present invention provides expeditious, low-cost, on-the-spot quality control and detection capabilities for consumers, producers, law enforcement, and border protection services. The present invention also provides methods for detecting cannabinoids in a liquid or gaseous sample with enhanced sensitivity and selectivity.

It should be clear that an OFET device may exist in various configurations which vary on the basis of the position of the electrodes and include: top contact top gate, top contact bottom gate, bottom contact top gate and bottom contact bottom gate configurations. The OFET device may also exist as a vertically integrated OFET, as a floating gate OFET, as an electrolyte gated OFET (EGOFET) or as an ion sensitive OFET (ISFET). As an exemplary embodiment, an OFET having a bottom gate bottom contact (BGBC) configuration is illustrated in FIG. 1A. A BGBC structure typically comprises a gate layer 10, a dielectric layer 20, a source electrode 30 and a drain electrode 40, and an organic semiconducting layer 50 therebetween. All configurations of OFETs are contemplated herein. Preferably, the devices of the present invention are electrochemical sensors in the form of an OFET having a BGBC configuration due to the coplanar nature of devices in accordance with the present invention.

In this aspect of the present invention, there is provided an OFET, wherein the gate layer may be Si and the dielectric layer may be $SiO_2$ or a liquid electrolyte dielectric as in an electrolyte gated OFET (EGOFET). The dielectric layer may be a solid, gel, or liquid such as an inorganic oxide, polymer, aqueous salt solution or ionic liquid. It will be appreciated that any suitable materials known in the art may alternatively be used for the gate layer and the dielectric layer. The source electrode and drain electrode are preferably gold. The organic semiconducting layer of the present invention may be any small molecule or conjugated polymer materials typically used in the art, including both p-type or n-type. For example, small molecules such as phthalocyanines, aligoacenes, pyrenes, thiophenes, perylene-diimide, and porphyrins or conjugated polymer including poly(fluorene)s, polyphenylenes, polypyrenes, polyazulenes, polynaphthalenes, poly(pyrrole)s (PPY), polycarbazoles, polyindoles, polyazepines, polyanilines (PANT), poly(thiophene)s (PT), poly(3,4-ethylenedioxythiophene) (PEDOT), poly(p-phenylene sulfide) (PPS), poly(acetylene)s (PAC), and poly(p-phenylene vinylene) (PPV) may be used. Preferably, metal phthalocyanine derivatives may be used. Most preferably, copper phthalocyanine (CuPc) or hexadecafluorophthalocyanine ($F_{16}$-CuPc) may be used.

Figure 1B:
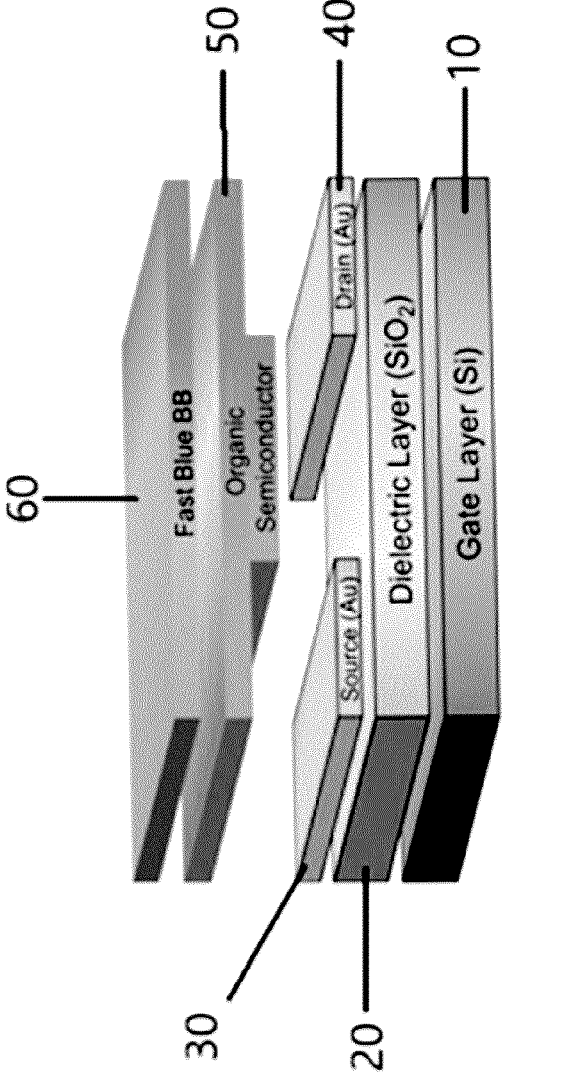
FIG. 1B is a cross section schematic representation of an organic field effect transistor (OFET) with a probe layer according to one embodiment of the present invention.

The electrochemical sensor of the present invention may be treated with a probe as illustrated in FIG. 1B. The probe 60 may form a probe layer. The probe 60 may be formed, for example, by drop casting an alkaline solution of a diazonium salt in a solvent. For example, acetonitrile may be used but any suitable solvent in which CuPc and $F_{16}$-CuPc are insoluble may be contemplated, such as a volatile solvent including dimethylacetamide, dimethylformamide, dimethylsulfoxide, N-methyl-2-pyrrolidone, 1,3-dimethyl-3,4,5,6-tetrahydro-2(1H)-pyrimidin-7-one, acetone, trichloromethane, decanol, dichloromethane, ethanol, ethyl acetate, isopropanol, and methanol. For example, the alkaline solution may have a pH around 9, using NaOH as the base. It will be appreciated that any base of similar strength may alternatively be used, such as any alkali metal hydroxides including NaOH, LiOH, KOH, RuOH, CsOH, $Ca(OH)_2$, $Sr(OH)_2$, $Ba(OH)_2$, and $Mg(OH)_2$, or any organic bases comprising substituted amines (triethylamine, diisopropylethylamine), piperidine and derivatives thereof. The diazonium salt may be any color indicator known in the art to bind with cannabinoids compounds, preferably 4-amino-2,5-diethoxybenzanilide diazotated zinc double salt (Fast Blue BB), o-dianisidine bis(diazotized) zinc double salt, (Fast Blue B) or 4-(4-diazonio-3-methoxyphenyl)-2-methoxybenzenediazonium dichloride (Fast Blue).

It is known in the art that the probe and cannabinoid reaction is used as a colour test for the detection of cannabinoids. This color test is limited by interference from non-cannabinoid compounds, and is unable to identify specific cannabinoids since they produce a red-orange colour that is difficult to differentiate by the naked eye. With the phthalocyanine derivative as the semiconductor material or semiconductor layer, interactions occur between the probe, phthalocyanine derivative and the cannabinoid that result in significant shifts in the electrochemical properties of the phthalocyanine derivative. The interactions between the probe or diazonium salt coupled with the cannabinoid (FBBB-cannabinoid complex) and the phthalocyanine derivative occur at both the periphery and the center of the semiconductor material. These unique electrochemical changes are specific to the probe-cannabinoid complex, and are not repeated when the probe (FBBB) or cannabinoid react solely with metal phthalocyanine derivative. These interactions between the probe-cannabinoid complex and the phtalocyanine derivative alter the properties of the semiconductor material, and these changes can be translated into an analog signal by a variety of transducers or sensors (e.g OFETs, electrochemical sensors, potentiometric sensors, voltammetric sensors, amperometric sensors, impedimetric sensors) and spectroelectrochemical sensors based on, for example UV/V as absorption spectroelectrochemistry, Raman spectroelectrochemistry. These unique changes, dependent on the particular cannabinoid, phthalocyanine derivative, and probe (diazonium salt) present in the reaction, allow for specific cannabinoid detection and differentiation. The phthalocyanine derivative can be metal or metal-free.

According to a method of the present invention, a liquid or gaseous sample is placed in contact with the OFET device. Voltages are applied to the gate-source ($V_{GS}$) and to the source-drain ($V_{SD}$), and current differential between the source and the drain electrodes is measured ($I_{SD}$). Mobility ($\mu$) and threshold voltage ($V_T$) may be extracted, cannabinoids may thus be selectively detected, and quantities, levels or ratios of different cannabinoids may be extrapolated. A variation of the method involves using a device that incorporates the electrical circuit elements noted above and the sensor element explained above. In the variant, the method includes contacting the liquid or gaseous sample with the sensor element and measuring an analog electrical signal through the electrical circuit elements. Changes in the electrochemical properties of the sensor element would show that the analog electrical signal measured by way of the electrical circuit elements would be different than a baseline measurement.

Figure 1C:
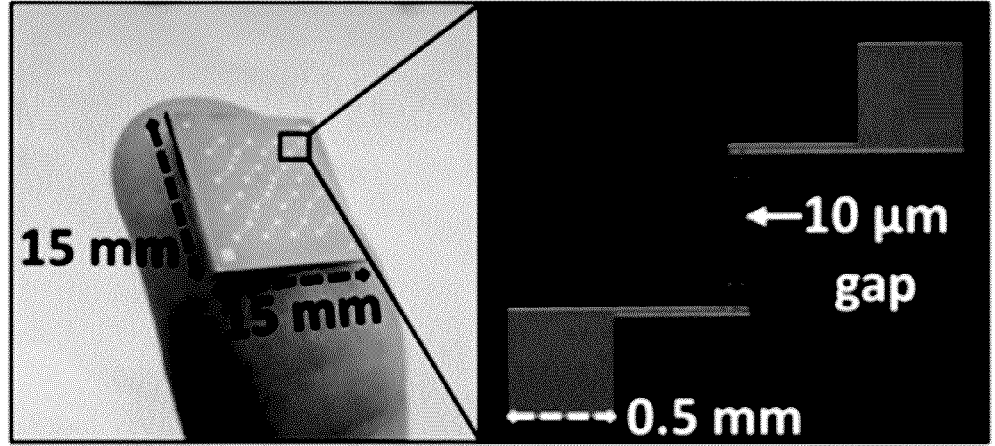
FIG. 1C is an image of the device of FIGS. 1A and 1B as a chip with an enlarged microscope image according to one embodiment of the present invention.

The OFET device of this aspect of the present invention may be in the form of one or more coplanar OFET circuits formed within an integrated circuit (i.e., an OFET chip), as shown in FIG. 1C. The OFET chip and/or the system of the present invention may be incorporated in various devices for different uses, such as wearable badges, wall-mounted devices, built-in devices for containers or vessels, consumer vaping devices or similar accessories, filters, or Tillable cigarettes, which may be coupled with an analytical reader, or may be incorporated in any portable or fixed analytical equipment. Thus, the OFET device in accordance with the present invention includes one or more OFET circuits coupled with additional electronics configured to relay sensed circuit characteristics to a user interface. Any user interface may be suitable such as, but not limited to, visual representations (e.g., screens, lights, or words), audio representation (e.g., buzzers, chimes, or vibrational alarms), or data sets indicative of sensed characteristics for further analytical processing by one or more computing devices.

For example, an OFET chip according to one aspect of the present invention may be incorporated into an OFET device forming a wearable battery-powered badge that may be activated as law enforcement officers enter premises or approach vehicles. The badge may sense the immediate environment of the law enforcement officer and provide a "yes/no" analysis for the presence of cannabinoids. If cannabinoids are present in the air (either through inherent volatility, vaporization, or combustion), the badge may display a signal (visual or audible) indicative of cannabinoid presence. The OFET device may include additional communications electronics enabling remote communications and may therefore be connected wirelessly by any suitable wireless protocol (e.g., via Bluetooth™) to a computing device (mobile smartphone, laptop computer, etc.), and thus provide records of the date, time, and approximate location of positive detection of environmental cannabinoids. For consumer or institutional purposes, similar badges or wall-mounted devices may be used in either a portable manner or in a fixed location. Moreover, the present invention may be effectively used to detect odour-free cannabinoid products. In that regard, it should be noted that while plant-derived *cannabis* products extract and carry the *cannabis* "overtones", cannabinoids produced by microbes may not produce the same smells whereby the present invention is advantageous in detection for a wide variety of settings presenting cannabinoids. The above exemplary implementation may allow for monitoring and reporting the presence of cannabinoids in the air, in private or public venues where

*cannabis* use is not permitted (e.g., public transport, non-smoking facilities, e.g., schools, hospitals, airplanes, etc.).

Another exemplary embodiment may allow for quality control during *cannabis* production. The storage of harvested plants/inflorescence during the cultivation-harvest-extraction process may lead to a change in the cannabinoid content of samples over time. Cannabinoid sensors according to the present invention may be built into storage containers or vessels for detecting vaporized cannabinoids that occurs during storage (i.e., natural off-gassing due to volatized cannabinoids), or any parts of equipment along the supply chain. The above may thus provide the ability to determine the ratio of cannabinoids released from samples, as well as the quantity of cannabinoid released. This application would provide for ongoing quality control during any steps of a *cannabis* supply chain.

Furthermore, an OFET chip or any implementation of a system that uses the sensor element and circuit elements explained above may be incorporated into a suitable device forming a consumer vaping device (i.e., vaporizers or electronic cigarettes) or accessory (e.g., fillable air bag inlet) to provide a measure of amount and ratio of cannabinoids in vapor produced by the given vaping device. As material is vaporized, gases would flow past the exposed OFET chip or system and provide on-the-spot readings of cannabinoid content. Sensors for humidity and temperature of the vapor may be included along with the cannabinoid sensing of the OFET chip or system to correct for output based on environmental conditions. Such temperature and humidity sensors may be miniaturized at the integrated circuit level in accordance with known structures and methods and thus are not described herein in any further detail. The same approach may be applied to combustion, where the FBBB-sensitized OFET chip or system may be incorporated into the design of filters or fillable cigarettes to provide sensed measurement of the amount and ratio of cannabinoids in smoke.

In another exemplary embodiment, an OFET chip or a suitable implementation of a system that uses the sensor element and circuit elements explained above may be incorporated into a device in the form of a clinical vaping device (including a vape pen) to provide a metered dose of THC and/or CBD delivery in a selective and controlled manner. As a material is vaporized, gases would flow past the OFET or system, which would be selectively set in advance so as to prevent further flow once a setpoint electrical output indicative of a corresponding sensed THC and/or CBD level is reached. This setpoint would correspond to a desired level of cannabinoid related to a targeted clinical effect. A time delay via appropriate lockout circuitry rendering the OFET device or system inoperable for a predetermined time period may be incorporated before the next cannabinoid delivery would be allowed.

It should be clear that any reference to OFET devices or chips in this document is applicable to the system of the present invention as well as its multiple possible variants. As noted above, for such a system, the sensor element changes its electrochemical properties when in contact with cannabinoids and this change in electrochemical properties can be determined/sensed by way of one or more analog signals. As should be clear, this one or more analog signals is indicative of these electrochemical properties of the sensor element.

According to the present invention, leaf punches or inflorescence samples may be taken from the plant and tested for THC:CBD ratio and total content on-the-spot for intermittent testing of plants in grow houses or grow fields such as for quality control or predicted efficacy purposes. A liquid extraction may be performed manually using acetonitrile or other suitable solvent. The liquid phase of the extract may be applied directly to the chip, and then placed in a reader to obtain analytical characterization. In another exemplary embodiment, the plant material may be placed directly into a reader designed to vaporize or pyrolyze the plant sample by any known mechanism (e.g., additional heating elements) and expose the chip to the vapor or smoke. Preferably, the reader would output data for processing by a computing device, such data corresponding to the THC:CBD ratio and total content following vaporization for a set time period.

During the development of end-user products containing cannabinoids alone or in any combination for cosmetic, cosmeceutical, natural product or pharmaceutical application, extracts of *cannabis* may be generated and processed into a proprietary formulation. To maintain rigorous control of the cannabinoid content and ratio of these products, a device according to the present invention may be used to sample the products at different points in the manufacturing process, for example as a liquid extract of the formulation, and to thereby provide rapid, on-the-spot analysis of cannabinoid content and/or ratio. Such a device should be understood as including at least one OFET or, preferably, an array of OFET arranged as an OFET chip which may then form any of the consumer or clinical devices previously described hereinabove. As well, for purposes of the following discussion, the term device will be used for illustrative clarity, but should in no way limit the invention. Using the device, quality control may be maintained during end-user product formulation. As the stability testing and shelf life determination of commercial *cannabis* products is required under regulatory frameworks in multiple jurisdictions, the sensor (whether for liquid or vapor) may be applied for rapid assessment of cannabinoid stability/degradation during stability trials. It should be clear that while the above mentions the use of an OFET, other suitable devices or systems that use the sensor element and electrical circuit elements noted above may be used in place of the OFET device.

EXAMPLE 1

Materials and Equipment

All chemicals were used as received unless otherwise specified. Copper phthalocyanine (CuPc, 90%) and Copper (II) 1,2,3,4,8,9,10,11,15,16,17,18,22,23,24,25-hexadecafluoro-29H,31H-phthalocyanine ($F_{16}$-CuPc, >99.9%) were obtained from TCI Chemicals. CuPc was purified twice by train sublimation before use. 4-Amino-2,5-diethoxybenzanilide diazotated zinc double salt (Fast Blue BB, FBBB) and (octyl)trichlorosilane (OTS, 97%) were obtained from Sigma-Aldrich. All solvents are HPLC grade and commercially available from Fisher Scientific of Hampton, New Hampshire. *Cannabis* plant samples were supplied by Hydropothecary of Gatineau, Quebec and cannabinoid standards were obtained from Toronto Research Chemicals of North York, Ontario.

Preparation of Devices

Pre-patterned silicon substrates, with a thermally grown, 210 nm thick, $SiO_2$ dielectric, and gold source-drain electrodes (W=2000 µm, L=10 µm) were purchased from Fraunhofer IPMS of Dresden, Germany and used to make bottom gate bottom contact transistors. Substrates were washed with acetone to remove the protective resist, rinsed with isopropanol and dried with nitrogen, before oxygen plasma treatment for 15 minutes. Substrates were then washed with water, rinsed with isopropanol, and dried with nitrogen before being submerged in a solution of 0.1% v/v octyltrichlorosilane OTS in toluene for 1 hour at 70° C. The silane treated substrates were then washed with toluene, rinsed with isopropanol, and dried with nitrogen. The substrates were further dried under vacuum at 70° C. for 1 hour. Dried substrates were transferred into an Angstrom EvoVac™ thermal evaporator (available from Angstrom Engineering, Inc. of Kitchener, Ontario) and 150 Å of CuPc or $F_{16}$-CuPc was deposited at 25° C. and pressure below $2 \times 10^{-6}$ ton at a rate of 0.3 Å/s by sublimation onto respective substrates. Devices were kept under nitrogen for up to two days prior to characterization.

Device Characterization

The source drain electrodes were contacted with BeCu alloy probe tips and electrical measurements were taken using a custom electrical probe station, oesProbe A10000-P290, (available from Element Instrumentation Inc. & Kreus Design Inc. of Richmond, British Columbia) with a Keithley 2614B (available from Tektronix, Inc. of Beaverton, Oregon) to set discrete $V_{DS}$ and $V_{GS}$ values, measuring IDS. From these measurements, the saturation field-effect mobility, threshold voltage, and on/off current ratio were determined. The general expression relating current to field-effect mobility and gate voltage in the saturation region is as follows:

$$I_{DS} = \frac{\mu C_i W}{2L}(V_{GS} - V_T)^2 \tag{1}$$

Where $I_{DS}$ is the source-drain current, $\mu$ is the field-effect mobility, $C_i$ is the capacitance, W is the width of the channel, L is the length of the channel, $V_{GS}$ is the gate-source voltage, and $V_T$ is the threshold voltage. Equation 1 may be rearranged, giving equation 2, such that the mobility and threshold voltage may be calculated directly from the slope and x-intercept of an $\sqrt{I_{DS}}$ v. $V_{GS}$ curve.

$$\sqrt{I_{DS}} = \sqrt{\frac{\mu C_i W}{2L}}(V_{GS} - V_T) \tag{2}$$

Baseline mobility values were obtained for each device prior to adding analytes and averaged. The maximum baseline value for an individual device (i.e., OFET chip) was linearly scaled to the average maximum baseline value and this scaling factor was applied to the resulting analyte mobility curves for that device. Liquid analytes, dissolved in acetonitrile (ACN), were pipetted directly onto the source/ drain channel and allowed to dry for 3 minutes before device characterization.

Vapor Experiments

Samples were vaporized at 210° C. in a Volcano™ Medic Vaporizer (available from PharmaSystems Inc. of Markham, Ontario) into an 8 L bag. Vapor was allowed to cool for 1 minute before being flowed over devices in a 500 mL container at an approximate rate of 90 mL/s. Samples in this vapor experiment included those types of vapors typically encountered within environments in which cannabinoids may be used and which sample materials may be found to obscure or otherwise obfuscate detection of THC and/or CBD. Here, wood chips were fine shavings of eastern white pine, cigarettes were Pall Mall™ Blue, e-cigarette fluid was Vapor Papi Original, and coffee grounds were President's Choice™ West Coast Dark Roast, all of which were tested for their baseline characteristics

HPLC Analysis

Cannabinoid standards of CBD, CBDa, THC, and THCa were made to 1 mg/mL in methanol. Ground *cannabis* plant material was extracted with 1 mg/mL of either ACN or 80:20 MeOH/$H_2O$ and 1 mL of supernatant was filtered with a 0.22 µm PTFE syringe filter (available from Chromatographic Specialties Ltd. Of Brockville, Ontario) after 2 minutes, 15 minutes, 30 minutes, or 60 minutes of agitation in solvent. Extracts (2 µL) were analyzed using an HPLC system (such as an Agilent™ 1100 HPLC available from Agilent of Santa Clara, California) with inline photodiode array detector (series G1315). A polar C18 Phenomenex Luna Omega column (100×2.1 mm; particle size 1.6 µm; pore size 100 Å) available from Phenomenex Inc. of Torrance, California was used for separation. The mobile phase consisted of water+ 0.1% formic acid (mobile phase A) and ACN+0.1% formic acid (mobile phase B). The gradient elution was the following: 0.0-1.0 minutes 75% B, 2.0-6.0 minutes 75%-85% B, 6.0-7.0 minutes 85% B, 7.0-15.0 minutes 75% B, followed by a 5 minutes column equilibration after each run. The flow rate was set at 0.25 mL/minute and the column temperature was maintained at 65° C. The chromatograms were detected at 210 nm.

Thin Film Characterization

UV-Vis spectra were acquired on a Cary™ 100 spectrophotometer (available from Agilent of Santa Clara, California) in a 3500 µL cuvette with a 10 mm path length (such as those available from Thorlabs Inc. of Newton, New Jersey). Cyclic voltammetry was conducted using a Bioanalytical Systems C3 electrochemical workstation (available from Bioanalytical Systems, Inc. of West Lafayette, Indiana). For liquid soluble samples, the working electrode was a 2 mm glassy carbon disk, the counter electrode was a coiled platinum wire, and the reference electrode was Ag/AgCl saturated salt solution. For vapor samples, the working electrode was ITO coated glass with 200 Å of vapor deposited CuPc or $F_{16}$-CuPc, exposed to THC vapor as described above, and partially suspended in the electrolyte mixture— all else identical. HPLC-grade dichloromethane was purged with nitrogen gas at room temperature prior to use. Four cycles from $-1.6$ V to $+1.6$ V at a scan rate of 100 mV/s were measured for each sample. Tetrabutylammonium perchlorate (1 M) was used as the supporting electrolyte and decamethyferrocene was used as an internal reference.

Atomic Force Microscopy

Tapping mode atomic force microscopy (AFM) images were obtained using a Dimension Icon™ AFM equipped with ScanAsyst-Air tips (each available from Bruker Corp. of Billerica, Massachusetts). Scans were performed at a scan rate of 1 Hz, with multiple locations on each surface investigated. Images were processed using NanoScope Analysis v.1.8. (available from Bruker Corp. of Billerica, Massachusetts)

Statistics

Data were analyzed by binomial test using Prism v.8.0.1. analysis software (available from GraphPad Inc. of San Diego, California).

RESULTS

Figure 2A:
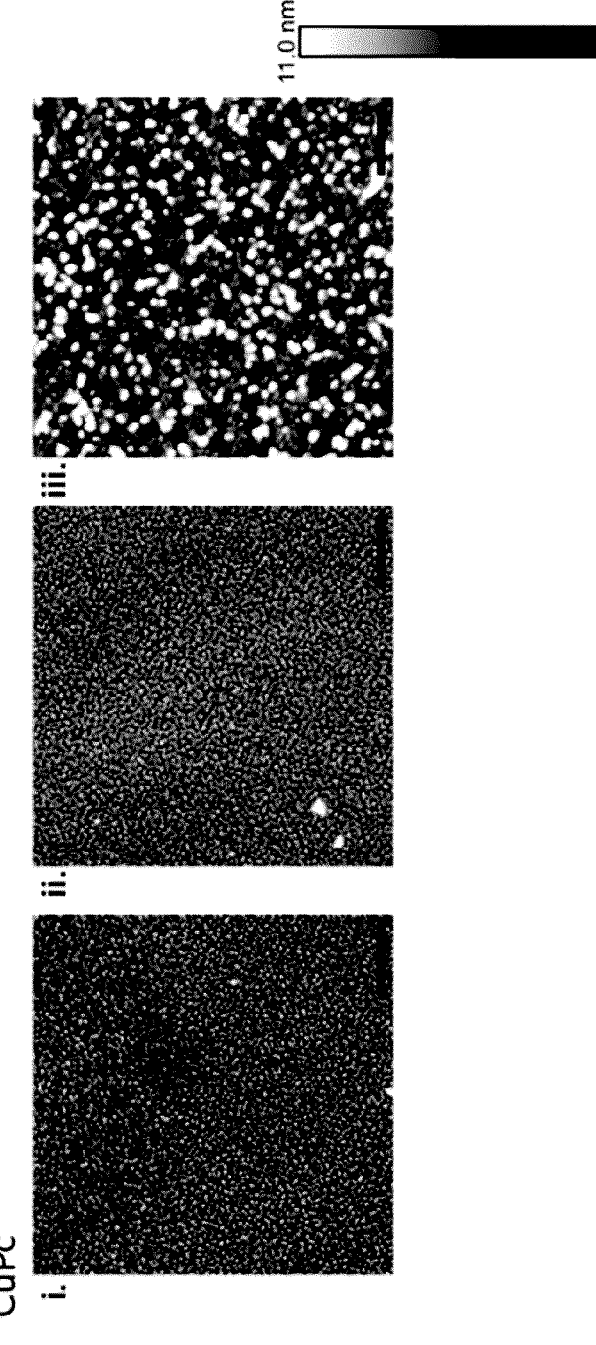
FIGS. 2A and 2B are atomic force microscopy images (AFM) according to exemplary embodiments of the present invention with FIG. 2A showing images of CuPc substrates and FIG. 2B showing images with $F_{16}$-CuPc substrates: with (i) no treatment, (ii) THC vapor treatment, (iii) FBBB with base followed by THC vapor treatment.
Figure 2B:
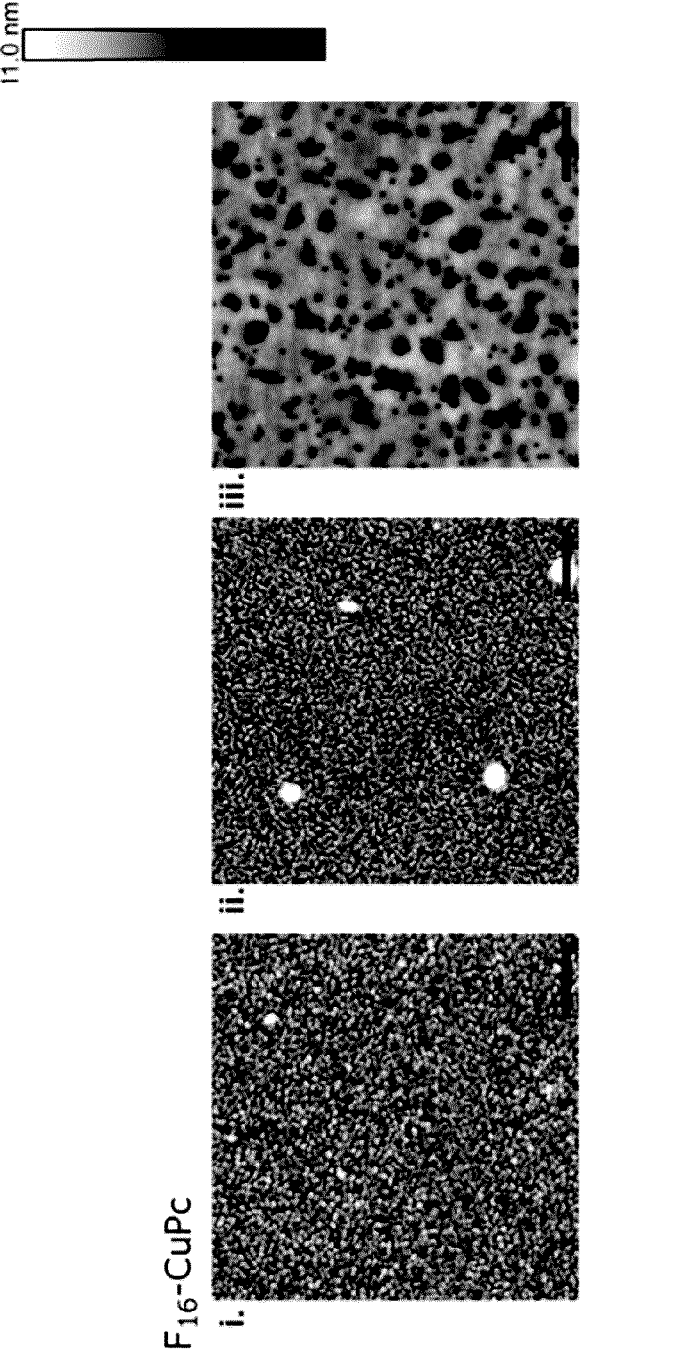

Bottom-gate bottom-contact (BGBC) OFETs were fabricated by vacuum vapor deposition as described above. Atomic force microscopy (AFM) images (FIGS. 2A and 2B) showed that the deposited semiconductor films were homogenous and consistent with literature results obtained under similar conditions. FIG. 2A shows the AFM images of a CuPc substrate and FIG. 2B shows the AFM images of a $F_{16}$-CuPc substrate. Specifically, (i) are the substrates with no treatment, (ii) are the substrates with THC vapor treatment and (iii) are the substrates with FBBB with base followed by THC vapor treatment.

Figure 3:
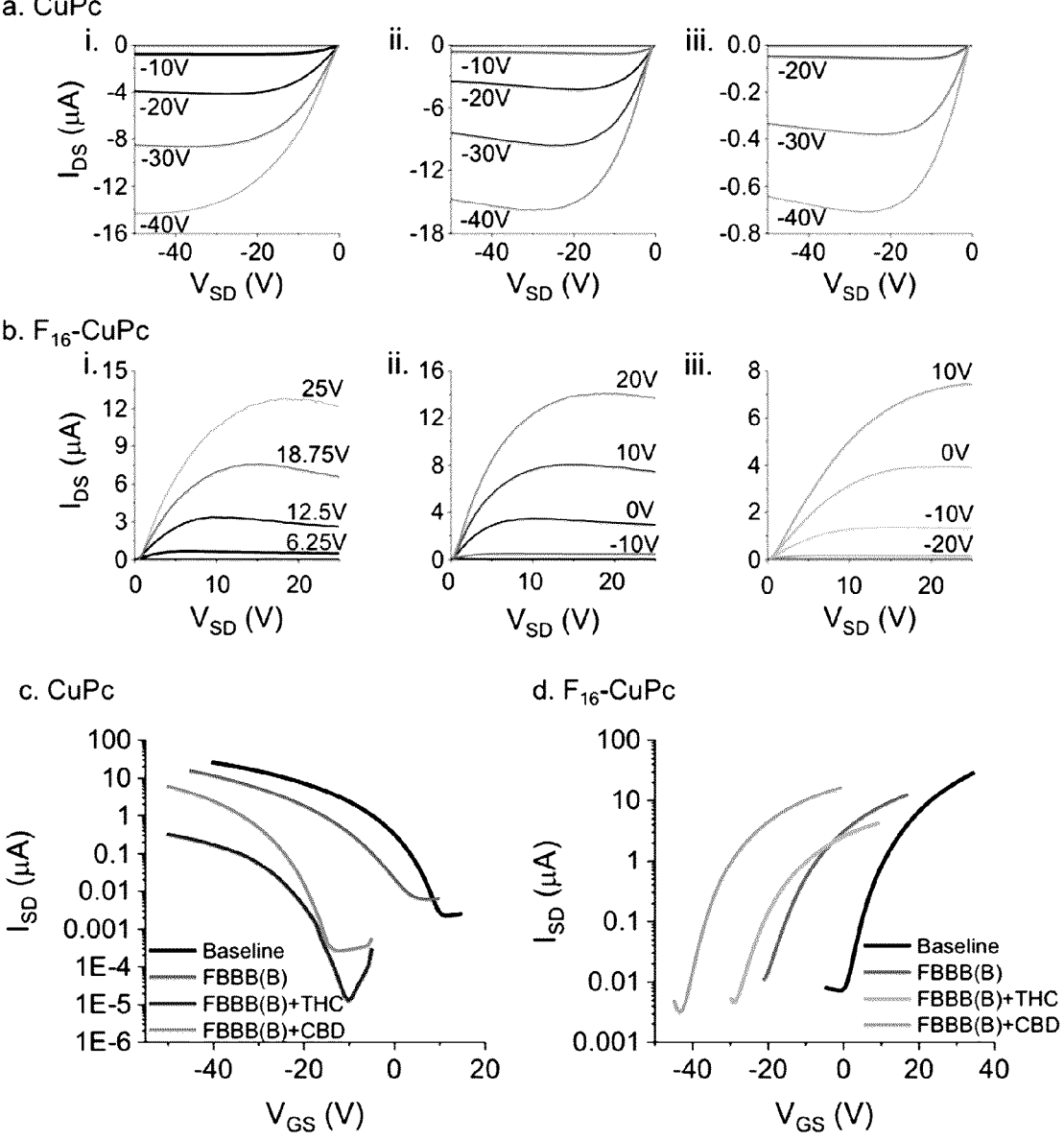
FIGS. 3A-D are graphs of output and transfer curves for devices according to exemplary embodiments of the present invention where

To sensitize OFETs to cannabinoid analytes, a thin film of FBBB was coated on top of the semiconductor layer through drop casting of an alkaline (pH 9, NaOH as base) solution in ACN (FIG. 1C). CuPc and $F_{16}$-CuPc are insoluble in ACN, making ACN a suitable carrier solvent for the FBBB trapping agent and other analytes. Output curves of CuPc and $F_{16}$-CuPc operating at 25° C. show that the addition of FBBB (20 μM) with base (50 μM) (FBBB(B)) does not substantially impact the Ion relative to baseline devices. However, the subsequent addition of THC (20 μM) causes a roughly twenty-fold and two-fold decrease in $I_{On}$ for CuPc and $F_{16}$-CuPc-based devices, respectively (FIGS. 3A and 3B). Transfer curves corroborate the findings from output curves (FIGS. 3C and 3D). Following the addition of THC or CBD to alkaline FBBB-bearing devices, transfer curves also show negative threshold voltage ($V_T$) shifts on $F_{16}$-CuPc-based devices, which are less pronounced on CuPc devices, as well as a decrease in $I_{Off}$ that was greater particularly for CuPc-based devices.

Device performance was characterized in air to approach conditions under which *cannabis* samples would be tested, exposing devices to variations in atmospheric humidity that may alter individual device performance. Device performance variability was accommodated by linearly scaling the calculated peak baseline mobility of each device to the overall peak average baseline mobility (Eq. 2). Application of this vertical scaling factor to the calculated mobility of devices yielded an 'adjusted mobility' to facilitate device-wise comparisons.

Figure 4:
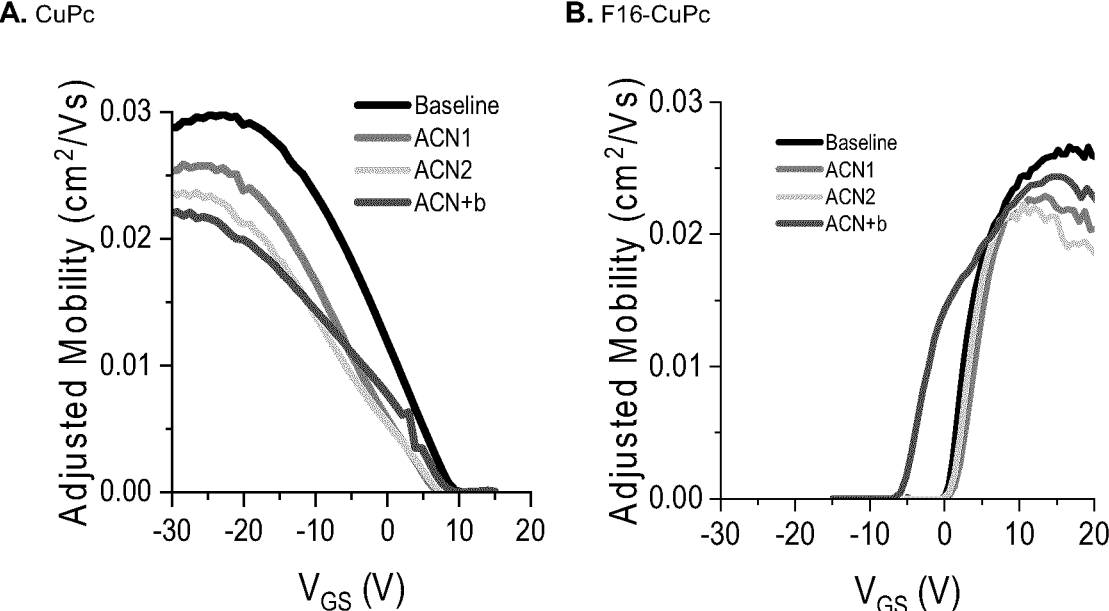
FIGS. 4A and 4B are graphs of the solvent effect on field-effect mobility for devices according to exemplary embodiments of the present invention, with FIG. 4A being a graph of the solvent effect on field-effect mobility for a CuPc device and with FIG. 4B being a graph of the solvent effect on field-effect mobility for a $F_{16}$-CuPc device.
Figure 5:
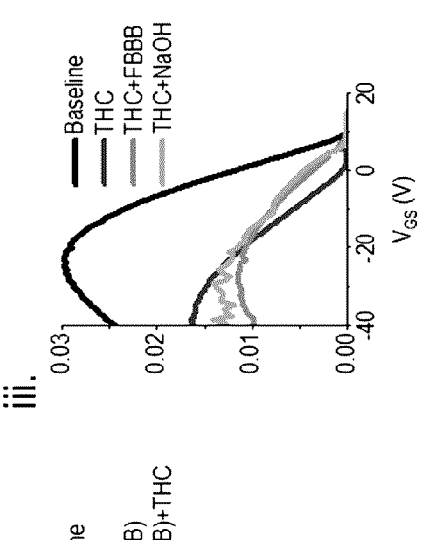
FIGS. 5A and 5B are graphs showing the effect of applied analyte on field-effect mobility for devices according to exemplary embodiments of the present invention, with FIG. 5A being a graph of adjusted mobility for a CuPc device and FIG. 5B being a graph adjusted mobility for a $F_{16}$-CuPc device, where, for both figures, (i) is for a semiconductor-only device, (ii) is for a FBBB probe layer, and (iii) is for a FBBB probe layer.
Figure 5:
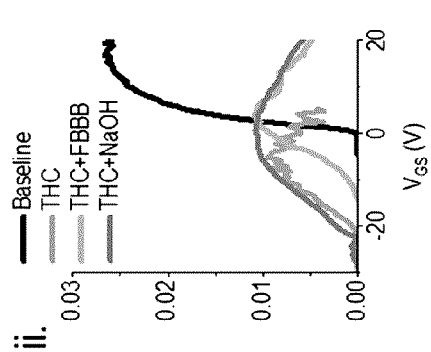
Figure 5:
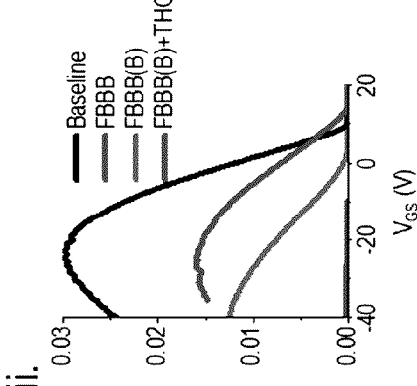
Figure 5:
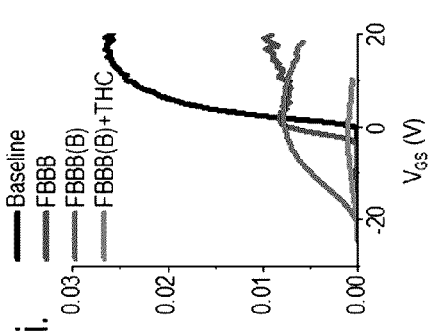
Figure 5:
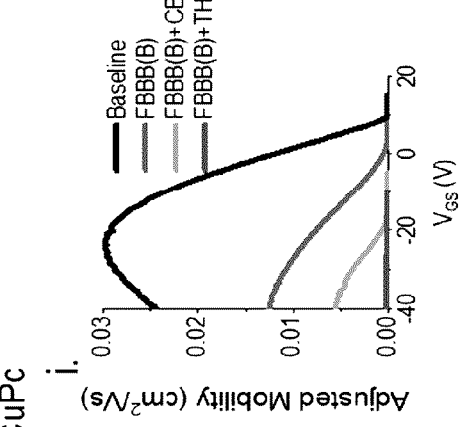
Figure 5:
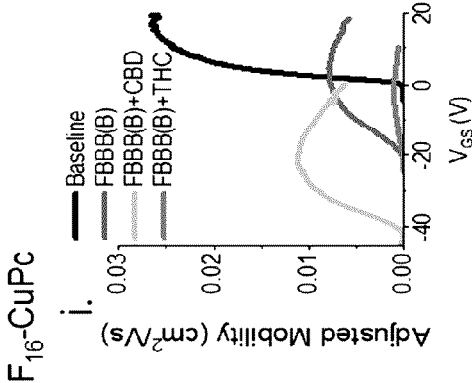

To evaluate the effect of the individual components necessary for cannabinoid sensing on device performance, solutions of individual components were drop cast onto the surface of devices. Repeated applications of ACN showed sequential decreases in $\mu_H$ of 14.2% and 8.5% on CuPc-based devices, and 15.2% and 2.4% decrease in $\mu_E$ on devices comprising F16-CuPc (FIGS. 4A and 4B). A single addition of NaOH showed a 29% decrease in $\mu_H$ and an 8% decrease in $\mu_E$. The addition of FBBB as a thin film overlying the semiconducting layer displayed an approximate 46.5% decrease in $\mu_H$ on CuPc, and a 59.5% decrease in $\mu_E$ on $F_{16}$-CuPc from the baseline, with an observed ±3V shift in $V_T$. The addition of FBBB with NaOH (pH 9) resulted in a −11 and −15 $\Delta V_T$, with an additional 7% drop in peak $\mu_H$ and a 10% drop in $\mu_E$ from FBBB on CuPc and $F_{16}$-CuPc-based OFETs, respectively (FIGS. 5A(i) and 5B(i)). THC alone (plant extract concentrate, 97% purity), THC with base, and THC with FBBB all displayed an approximate 53.0±6.9% decrease in $\mu_H$ and 61.1±2.4% decrease in $\mu_E$ from the baseline (FIGS. 5A and 5B). Only in the presence of alkaline FBBB did the subsequent addition of THC cause a significant decrease in both $\mu_H$ and $\mu_E$ (96.0% and 98.9% respectively) from that observed with FBBB alone (FIGS. 5A(i) and 5B(i)).

Similar to THC, the addition of CBD (plant extract concentrate, 99% purity) to devices with FBBB and base resulted in a $\Delta V_T$ of roughly −20 V with an 81% decrease in $\mu_E$ and 58.1% decrease in $\mu_E$ relative to baseline (FIGS. 5A(i) and 5B(i)). These results show that alkaline FBBB is necessary for the specific detection of THC and CBD. Importantly, the OFET readouts are characteristic of the cannabinoid type applied, with THC and CBD yielding differential responses on both CuPc and $F_{16}$-CuPc (FIGS. 5A(i) and 5B(i)). Thus, CuPc and $F_{16}$-CuPc may both be used as the active materials in OFET based sensors for the differential detection of THC and CBD when using a thin film of alkaline FBBB as a cannabinoid sensor.

Figure 6:
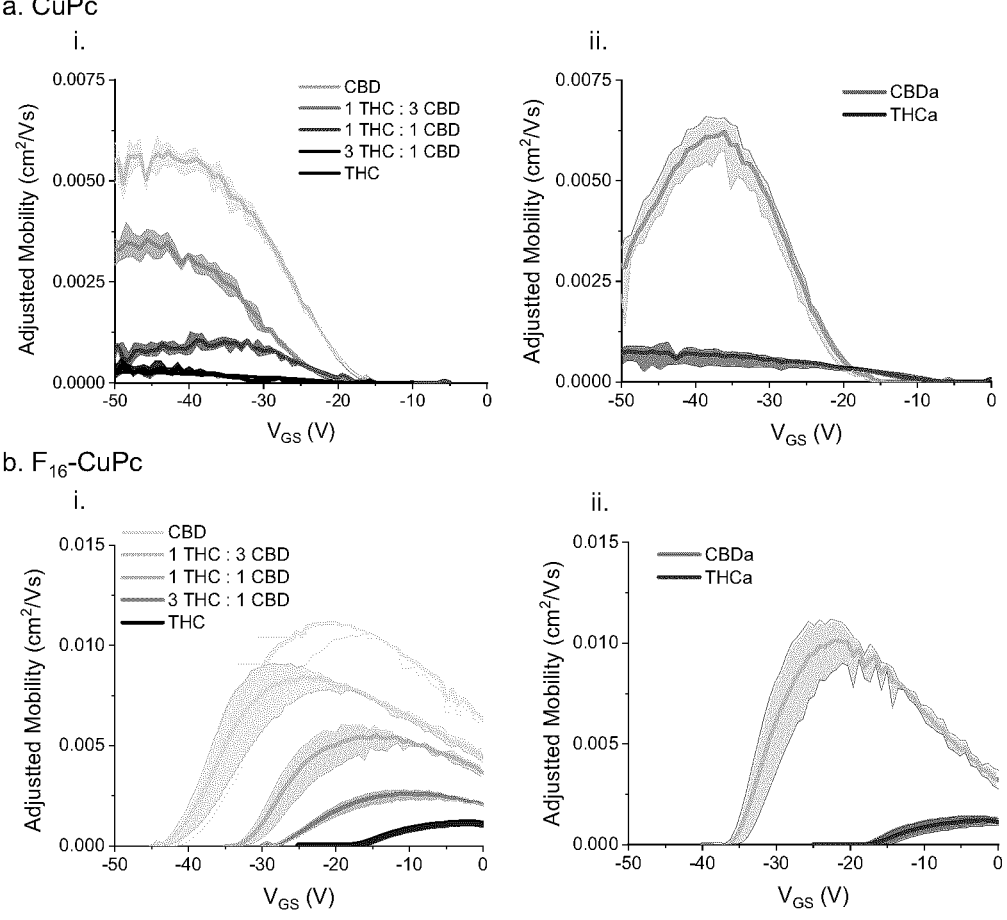
FIGS. 6A and 6B are graphs showing the effect of primary cannabinoid ratios on field-effect mobility for devices according to exemplary embodiments of the present invention where

THC and CBD mixtures, comprised of plant extract concentrates in ACN described previously, were prepared in 1:3, 1:1, and 3:1 molar ratios, and were drop cast onto the surface of devices coated with alkaline FBBB. The adjusted mobility maxima were found to lie between those obtained for pure THC and CBD extract solutions with the overall device output dependent upon relative cannabinoid content (FIGS. 6A(i) and 6B(i)). When applied to CuPc-based devices, the adjusted mobility varied inversely with THC content, with limited changes in $V_T$ of <5V (FIG. 6A(i)). However, when analyzed by $F_{16}$-CuPc based-OFETs, adjusted mobility varied inversely and $V_T$ varied directly with THC content (FIG. 6B(i)). Using the reproducible device readouts for each THC:CBD ratio analyzed, standard curves for calculating CBD:THC content in samples were generated. Analytical standard solutions of THCa and CBDa were also applied to the OFET devices and the corresponding curves were found to approximate those of pure THC and CBD respectively (CuPc; THC:THCa $\Delta\mu$=−4.5E-4 cm$^2$/Vs, $\Delta V_T$=6 V, CBD:CBDa $\Delta\mu$=−4.0E-5 cm$^2$/Vs, $\Delta V_T$=−1 V, $F_{16}$-CuPc; THC:THCa $\Delta\mu$=−4.9E-5 cm$^2$/Vs, $\Delta V_T$=−2 V, CBD:CBDa $\Delta\mu$=1.0E-3 cm$^2$/Vs, $\Delta V_T$=+7 V) (FIGS. 6A(ii) and 6B(ii)). While chemically and pharmacologically distinct from the decarboxylated active cannabinoid compounds, results show that the acid is undifferentiable from the alcohol form. Considering that heating (i.e., baking or smoking) induces decarboxylation, the hypothesis was made that by using alkaline FBBB-coated OFETs, the total complement of (THC+THCa):(CBD+CBDa) in a sample pre-pyrolysis may be determined by the device, and furthermore may predict post-pyrolysis THC:CBD content.

Figure 7:
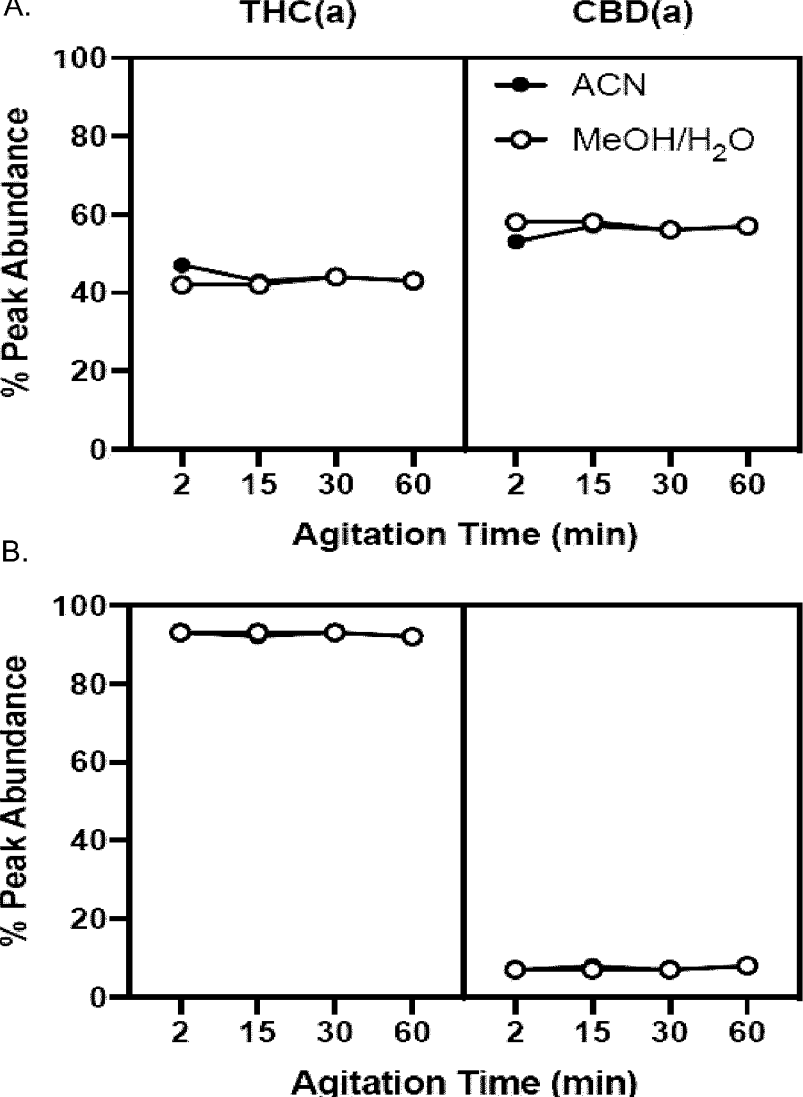
FIGS. 7A and 7B are graphs of HPLC-DAD percentage of peak abundance of primary cannabinoids where
Figure 8:
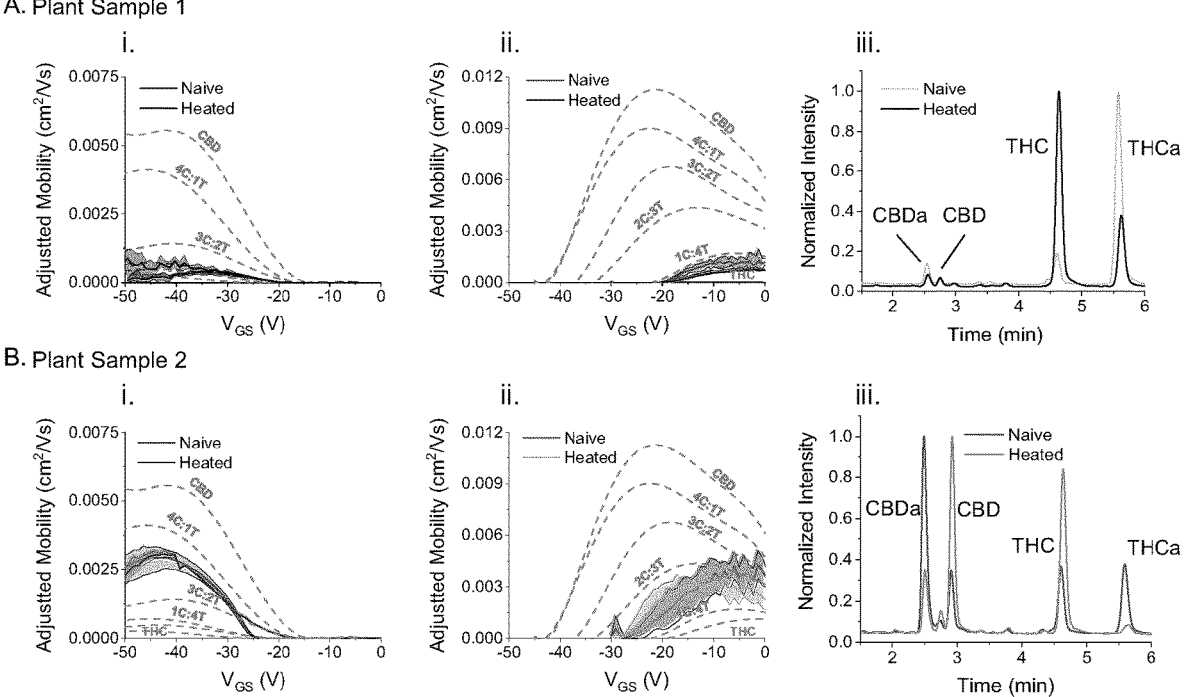
FIGS. 8A and 8B are graphs of adjusted mobility and HPLC-DAD analysis for devices according to exemplary embodiments where
Figure 9:
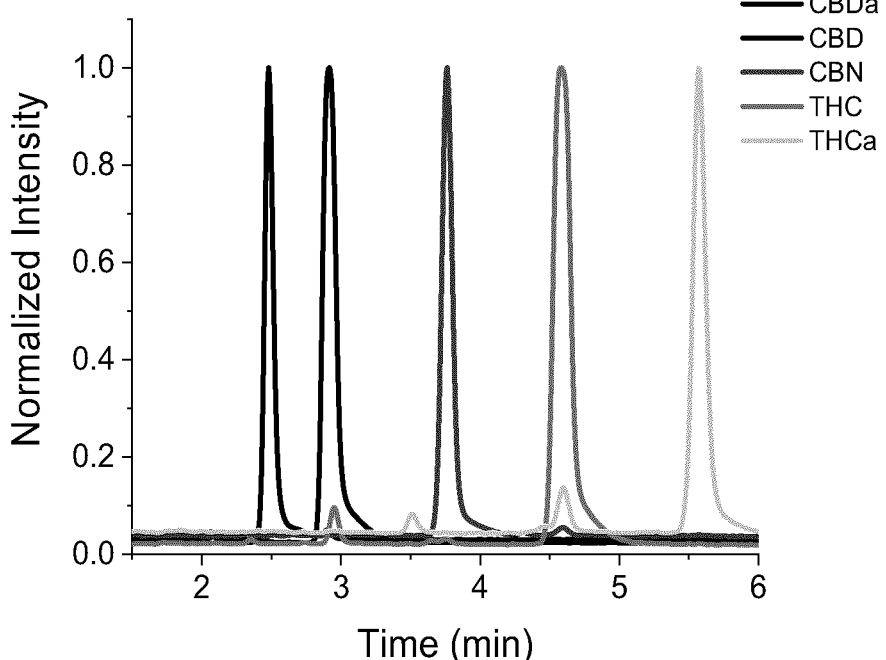
FIG. 9 is a graph of normalized intensity of industrial HPLC cannabinoids standards.

To test this hypothesis, small samples (~3 mg) were harvested from the inflorescence of two different *Cannabis* plants previously stated to contain approximately 20% w/v primary cannabinoids by the supplier (Hydropothecary of Gatineau, Quebec). A simple extraction on the naïve *Cannabis* bud samples was carried out where approximately 3 mg of plant material in ACN (1 mg/mL) was manually agitated for 2 minutes, filtered and diluted 20-fold in ACN prior to addition directly to the device surface, which was necessary to avoid overloading devices. To validate the manual, short extraction method, longer and mechanically agitated extractions were performed in ACN alongside 80:20 MeOH/H$_2$O, a gold standard in extraction media for plants with bioactive compounds. No significant deviation from the 90-95% extraction efficiency between solvent systems and extraction times were observed (FIGS. 7A and 7B). To evaluate plant samples both pre- and post-heating, a portion of extract from each plant was heated at 115° C. for 45 minutes to decarboxylate cannabinoids to their alcohol forms, while another portion was left untreated. It was determined by HPLC analysis of the extracts that approximately 73 and 85 wt % of samples 1 and 2, respectively, were decarboxylated (FIGS. 8A(iii) and 8B(iii)). Peak identities were confirmed by comparing retention times against those resulting from authentic cannabinoid standard samples (FIG. 9). Using the OFET standard curves generated from standard THC:CBD solutions (FIGS. 6A(i) and 6B(i)), the ratio of THC to CBD was determined by linear interpolation from the average mobility curve of *Cannabis* plant sample extracts (Table 1). CuPc-based devices consistently predicted ratios slightly greater than those determined by HPLC for each plant sample, while $F_{16}$-CuPc consistently predicted smaller values. HPLC determined ratios are only accurate to within 3-10% of the real value due to extraction inefficiencies, variations in inflorescence composition, and varying maximal absorbances of the primary cannabinoids assayed. The THC:CBD ratio determined by averaging CuPc- and $F_{16}$-CuPc-based analyses resulted in an error rate of 5.5%, which is within the accuracy range for ratios determined by HPLC. These results suggest that CuPc- and $F_{16}$-CuPc-based OFETs may be used to identify the ratio of THC to CBD in diluted naïve plant ACN extractions, and that pre-heated samples predict THC and CBD content post-pyrolysis.

Table 1 shows a comparison of estimates by OFET of primary cannabinoid ratios to HPLC-DAD from simple plant sample extractions. Mobilities from −40 to −50 $V_{GS}$ for CuPc and −10 to 0 $V_{GS}$ for $F_{16}$-CuPc OFETs were linearly fit to fifth order polynomial standards curves and averaged for each plant sample. Also shown is standard deviation. Ratios for each material were averaged again to give OFET average. HPLC ratios were determined by direct comparison of peak area.

TABLE 1

| Measurement Method | Measured Cannabinoid Ratio (CBD:THC) | |
| | Plant Sample 1 | Plant Sample 2 |
| --- | --- | --- |
| CuPC | 11:89 ± 4.5 | 66:34 ± 0.7 |
| F16-CuPC | 5:95 ± 0.5 | 36:64 ± 0.4 |
| OTFT Average | 8:92 | 51:49 |
| HPLC | 3:97 | 57:43 |

Detection of Vaporized Cannabinoids using OFET

Figure 10:
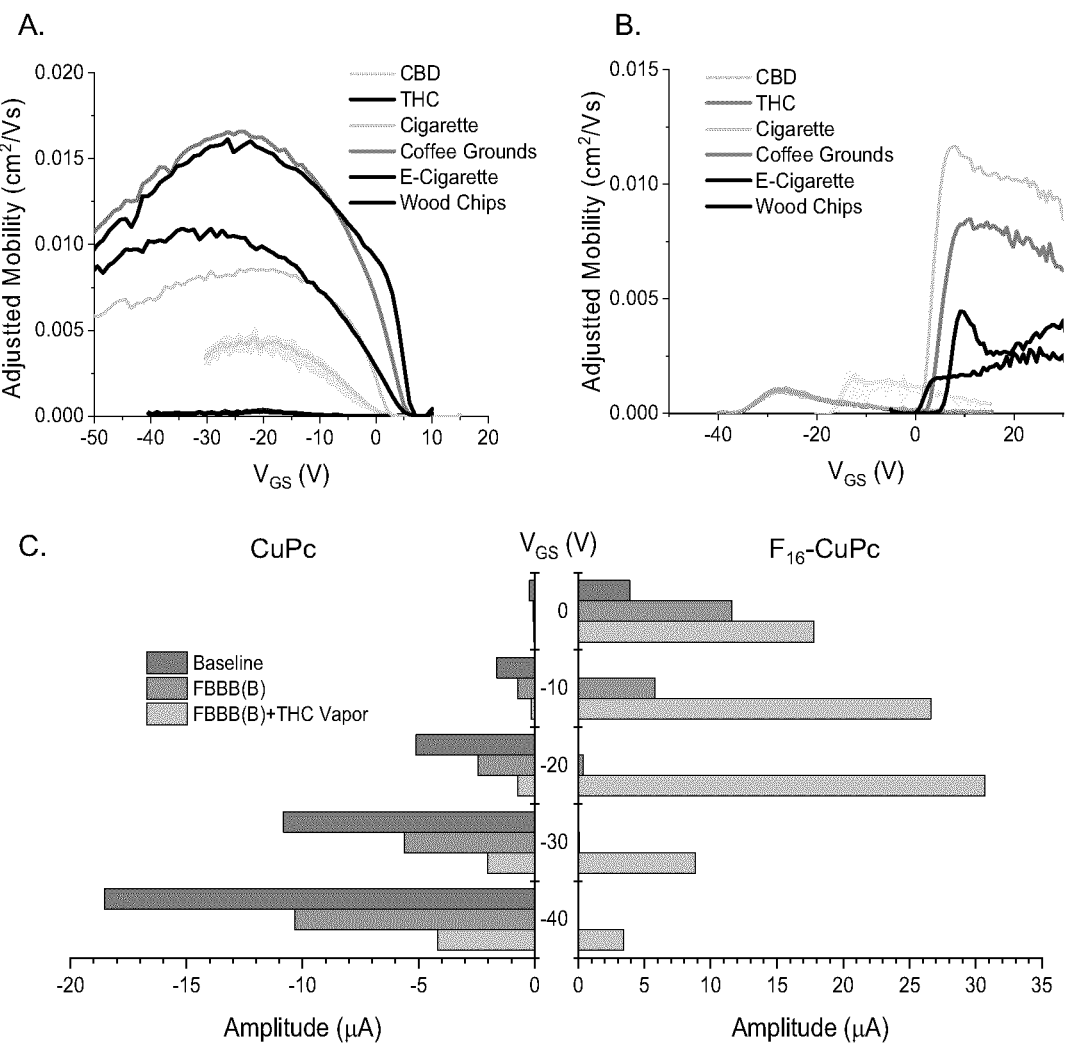
FIGS. 10A-C are graphs showing the effect of vapor treatment and single current output for devices according to exemplary embodiments of the present invention and where

While on-the-spot plant extract analysis is of interest to producers, dispensaries, and consumers, cannabinoid detection for the vapor phase is of special interest to law enforcement seeking objective measures of *Cannabis* use in prohibited environments (e.g., automobiles). To this end, alkaline FBBB-bearing OFET devices were exposed to THC or CBD vapor, as well as a variety of vaporized materials that were previously indicated to interfere with FBBB-mediated cannabinoid detection (coffee grounds, or wood smoke), or might be found alongside *cannabis* (cigarette or e-cigarette smoke). Following 1.5 min exposure to equivalent vapor volumes, the resulting mobility as a function of gate-source voltage ($V_{GS}$) curves for the CuPc- and $F_{16}$-CuPc-based OFET devices were obtained (FIGS. 10A and 10B). Exposure to THC vapor resulted in a substantially reduced $\mu_H$ and $\mu_E$ on both CuPc- and $F_{16}$-CuPc-based devices, and a −$\Delta V_T$ of 35 V on F16-CuPc (FIG. 10). Devices exposed to CBD vapor behaved similarly to those exposed to liquid samples, with a decrease in $\mu_H$ and $\mu_E$ on both CuPc- and $F_{16}$-CuPc-based devices, and a −$\Delta V_T$=18 V on $F_{16}$-CuPc.

The effect of putative interfering vapours on CuPc- and $F_{16}$-CuPc-based device functionality was also analyzed similarly to CBD and THC vapor (FIGS. 10A and 10B). As a whole, interfering vapor compounds resulted in varying degrees of reduction in mobility on both CuPc and $F_{16}$-CuPc, with cigarette smoke reducing $\mu_H$ to the greatest extent (FIG. 10A), and wood chips reducing $\mu_E$ to the greatest extent (FIG. 10B). However, on CuPc-based devices, the effect of the cannabinoids was substantially greater (10-fold and 2-fold for THC and CBD, respectively) than any of the interfering compounds. While the effect on $F_{16}$-CuPc-based device mobility was cannabinoid-dependent, interfering vapours were readily differentiable from CBD and THC vapor by their effects on $V_T$. Only THC and CBD resulted in $\Delta V_T$<0 V, with $V_T^{THC}$=−35 V and $V_T^{CBD}$=−23 V (FIG. 10B). CuPc- and $F_{16}$-CuPc-based devices produced an electrical fingerprint that uniquely identified cannabinoids from other interfering compounds in vapor phase, and that may speciate CBD from THC when analyzing both extrinsic semiconductors in array.

To approach practical implementations, alkaline FBBB-treated CuPc- and $F_{16}$-CuPc-based devices were exposed to THC vapor (3.125 mg/L) for 1.5 min, followed by assessment of OFET performance (i.e. $I_{DS}$ measurement) at discrete and constant $V_{GS}$ values, rather than a voltage sweep (FIG. 10C). Device performance following single $V_{GS}$ readings parallel those obtained using voltage sweep (FIG. 10C v. FIGS. 10A and 10B): CuPc-based alkaline FBBB-coated devices showed the highest A/Ds following exposure to THC at setpoint $V_{GS}$=−20 V. Likewise, $F_{16}$-CuPc-based alkaline FBBB-coated devices showed a maximum thirty-fold increase in $I_{DS}$ at $V_{GS}$=−20 V. These results suggest that, on a CuPc- and $F_{16}$-CuPc-based device array, a single $V_{GS}$=−20 V may be applied and changes in $I_{DS}$ relative to previously measured "unexposed" current may indicate the presence of THC vapor.

Thin Film Characterization

Figure 11:
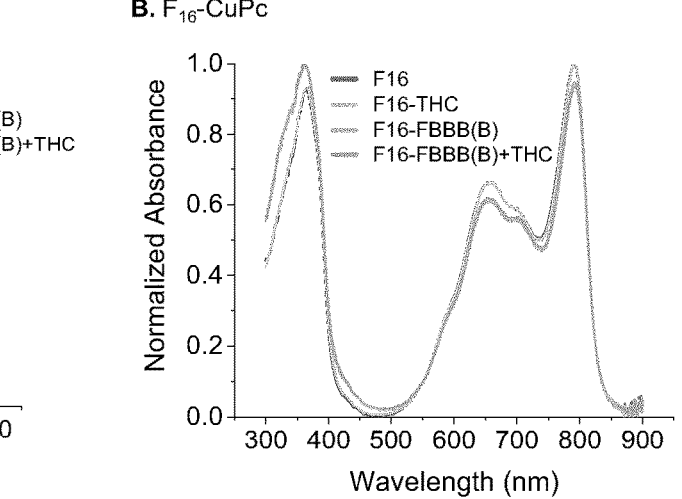
FIGS. 11A and 11B are graphs of absorbance and cyclic voltammetry for devices according to exemplary embodiments of the present invention where

To evaluate the spectral and electrical properties of the devices, thin films of CuPc and $F_{16}$-CuPc were deposited by thermal evaporation onto glass and ITO treated glass such that they were exposed to THC vapor and solid-state absorbance and cyclic voltammetry (CV) data collected. The Si/SiO₂ device substrates were not used for this characterization due to their opacity. Exposure of CuPc to THC vapor slightly reduced the relative absorbance at the Q band peak (600 nm), suggesting interaction with the conjugation of the macrocycle (FIG. 11). THC exposure of CuPc and analysis by CV revealed a −0.24 V shift at the single oxidation peak (FIG. 11). However, treating CuPc with alkaline FBBB caused a decrease in absorbance at the Q-band peak, with subsequent exposure to THC vapor causing a further drop in relative absorbance at 600 nm. Interestingly, with $F_{16}$-CuPc, only a slight reduction in Q-band peak was observed with all treatments, but this was accompanied by a slight increase in the Soret band upon treatment with alkaline FBBB and exposure to THC vapor (FIG. 11). By cyclic voltammetry, $F_{16}$-CuPc was found to undergo reversible oxidation and reduction, with the oxidation peak shifting −0.25 V upon exposure to THC.

AFM was performed to assess morphological changes to the thin film coating of the OFETs under various conditions (FIG. 2). $F_{16}$-CuPc was observed to have larger grains and an overall smoother surface than CuPc; these factors are a result of the different molecular structures and electronic characteristics, influencing vapor deposition crystal growth. Micrographs show that 25 mg/L THC vapor exposure over 90 s, which renders OFET devices inoperable, had no marked visual effect on baseline surface morphology of the devices. Treatment with alkaline FBBB followed by exposure to THC vapor also appears to have no significant effect on the semiconducting surface morphology for both CuPc- and $F_{16}$-CuPc-based devices. This thin film characterization suggests that the change in electrical response when the OFETs were coated with alkaline FBBB and exposed to THC is likely not due to a change in film morphology but rather changes in electronic configuration of the FBBB layer on top of the semiconductor.

EXAMPLE 2

Materials $H_2Pc$ (metal free phthalocyanine), tbt-CuPc (Copper (II) 2,9,16,23-tetra-tert-butyl-phthalocyanine), and ts-CuPc (3,4', 4", 4'''-tetrasulfonic acid copper (II) phthalocyanine) 4-amino-2,5-diethoxybenzanilide diazotated zinc double salt (Fast Blue BB, FBBB), tetrabutylammonium perchlorate (TBAP), and (octyl)trichlorosilane (OTS, 97%) were obtained from Sigma-Aldrich. CoPc, FePc, and AlClPc were obtained from TCI Chemicals. All phthalocyanines were purified by train sublimation before use. All other materials were used as received unless otherwise noted. Cannabinoid standards were obtained from Toronto Research Chemicals. All solvents were HPLC grade and purchased from Fischer Scientific.

Spectroelectrochemistry $10^{-4}$ M of phthalocyanine was thoroughly mixed in DMSO and filtered through a 0.2 μm syringe filter before the addition of 0.1M TBAP electrolyte. 3 mL of solution was placed in a custom spectroelectrochemical cell and a baseline absorbance measurement was taken with an Ocean Optics flame spectrometer with a filter width of 5 μm. A CV curve between 0.5 and -1.9 V was then collected with a Princeton Instruments VersaSTAT 3 Potentiostat Glavanostat at at a rate of 0.1 mV/s with a platinum micromesh working electrode, platinum wire counter electrode, and Ag/AgCl reference electrode. UV-Vis absorption measurements were then carried out at precise time intervals while a constant voltage bias corresponding to first reducing peak of the previously obtained cyclic voltammogram was applied to the cell.

NMR

A number of $^{1}$H-NMR and DOSY experiments were performed on a Bruker Avance IIIHD 600 MHz spectrometer equipped with a cryoprobe using the standard Bruker one-pulse program and stimulated echo DOSY pulse program, respectively. The one-pulse spectra were collected with 16 scans using a 30° pulse. The acquisition time was 4 seconds. DOSY experiments were carried out with gradient strengths varying quadraticly over 32 increments from 2% to 98% of the maximum gradient strength (~50 T/m). The total diffusion gradient duration and diffusion time were 3 msec and 100 msec, respectively. Each increment was collected with 16 scans, a 4 second acquisition time and a 4 second recycle delay. NOESY spectra were performed on a Bruker Avance II 400 MHz spectrometer using the standard gradient NOESY pulse program with a mixing time of 1 second. Spectra consisted of 256 increments each with 16 scans and a 1 second recycle delay. In all spectra, the chemical scale was calibrated to the residual proton signal of DMSO-6 at 2.50 ppm.

Preparation and Device Characterization

Silicon substrates with thermally grown 230 nm thick $SiO_2$ dielectric and prepatterned gold-source drain electrodes (W=2000 μm, L=10 μm) were purchases from Fraunhofer IPMS and used to make bottom-gate bottom-contact transistors. Each Fraunhofer contained four devices. Substrates were first washed with acetone to remove the photoresist, then rinsed with isopropanol and dried with a nitrogen gas stream. Substrates were then treated with oxygen plasma for 15 minutes and subsequently rinsed with water, isopropanol, and dried with a nitrogen gas stream before being immersed in a solution of 0.1% v/v OTS in toluene for 1 h at 70° C. The OTS treated substrates were washed with toluene, isopropanol, and dried with a nitrogen gas stream before being transferred into an Angstrom Evo-Vac thermal evaporator and 150 Å of CuPc, CoPc, or $H_2Pc$ was deposited at 25° C. and pressure below $2*10^{-6}$ ton at a rate of 0.3 Å/s by sublimation onto the respective substrates.

For this example, the device was prepared in much the same manner as in Example 1 above. It should, however, be clear that maximum and minimum obtained mobilities are displayed in plots in lieu of standard deviation to better represent reproducibility in the device performance.

Spectroelectrochemistry affords the opportunity to easily and rapidly assay conduction mechanisms and molecular interactions in solution that may inform semiconductor-analyte pairing suitability without the need to fabricate and engineer a solid-state device. Pcs (phthalocyanines) lend themselves well to spectral analysis as they have two well defined spectral regions: the B or Soret band, and the Q band which correspond to different $\pi{\rightarrow}\pi^*$ electron transitions. Variations in wavelength and intensity of specifics peaks in the Q band region can give significant information about molecular orientation, coordination, reduction states, and the HOMO-LUMO bandgap energies. Additionally, in the 400-500 nm region, metal-ligand coordination peaks can be visualized, further elucidating molecular interactions. By applying a reducing potential during spectroscopy, we can visualize changes to the Pcs as they accept and donate charge in the presence of analytes, The effects of the two cannabinoids (THC and CBD) and 4-amino-2,5-diethoxybenzanilide diazoated zinc double salt (FBBB), a colorimetric cannabinoid binding agent, on the reduction processes of metal-free and a variety of metal-bound Pcs with substitutes were examined. Solvents play a significant role in peak locations and intensity of Pc spectra in addition to their electrochemical processes. Spectroelectrochemical changes of analyte-PC solutions were correlated to shifting ratios of Pc-Pc and Pc-analyte coordination configuration states, and corroborate these opto-electronic signals with structural outcomes by 1D and 2D-NMR experiments. Ultimately, this validated a solution-based workflow for semiconductor-analyte pair optimization by relating spectroelectrochemical outcomes to OTFT device performance for practical sensing applications.

Spectroelectrochemical Reduction Processes of Phtalocyanines

Figure 12:
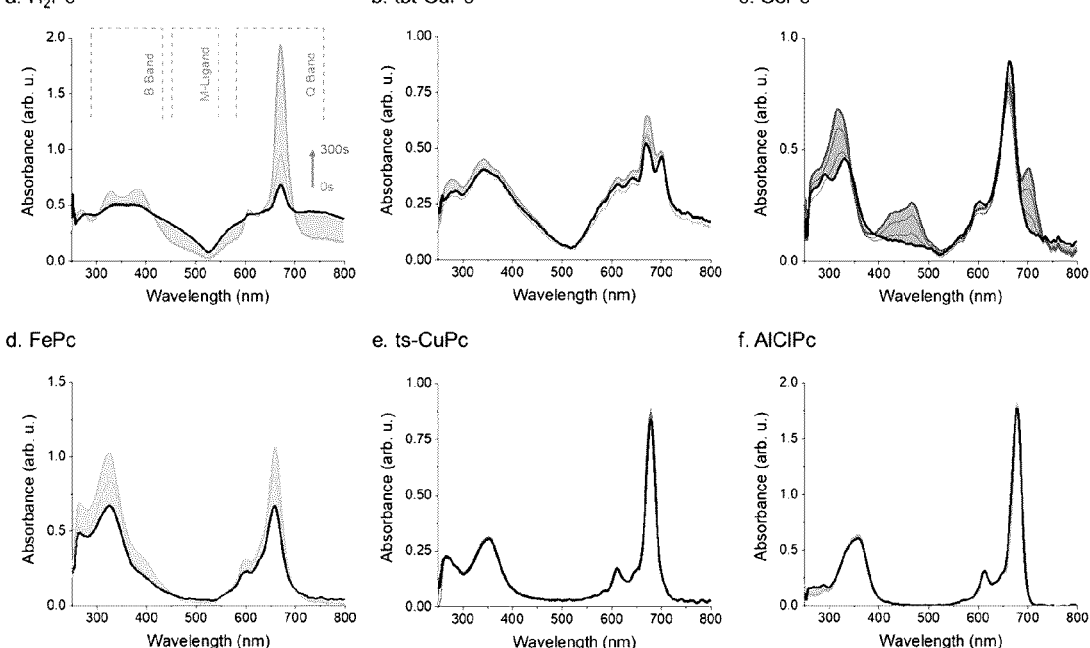
FIG. 12 shows spectroelectrochemical reduction processes of different phthalocyanines (Pcs)
Figure 13:
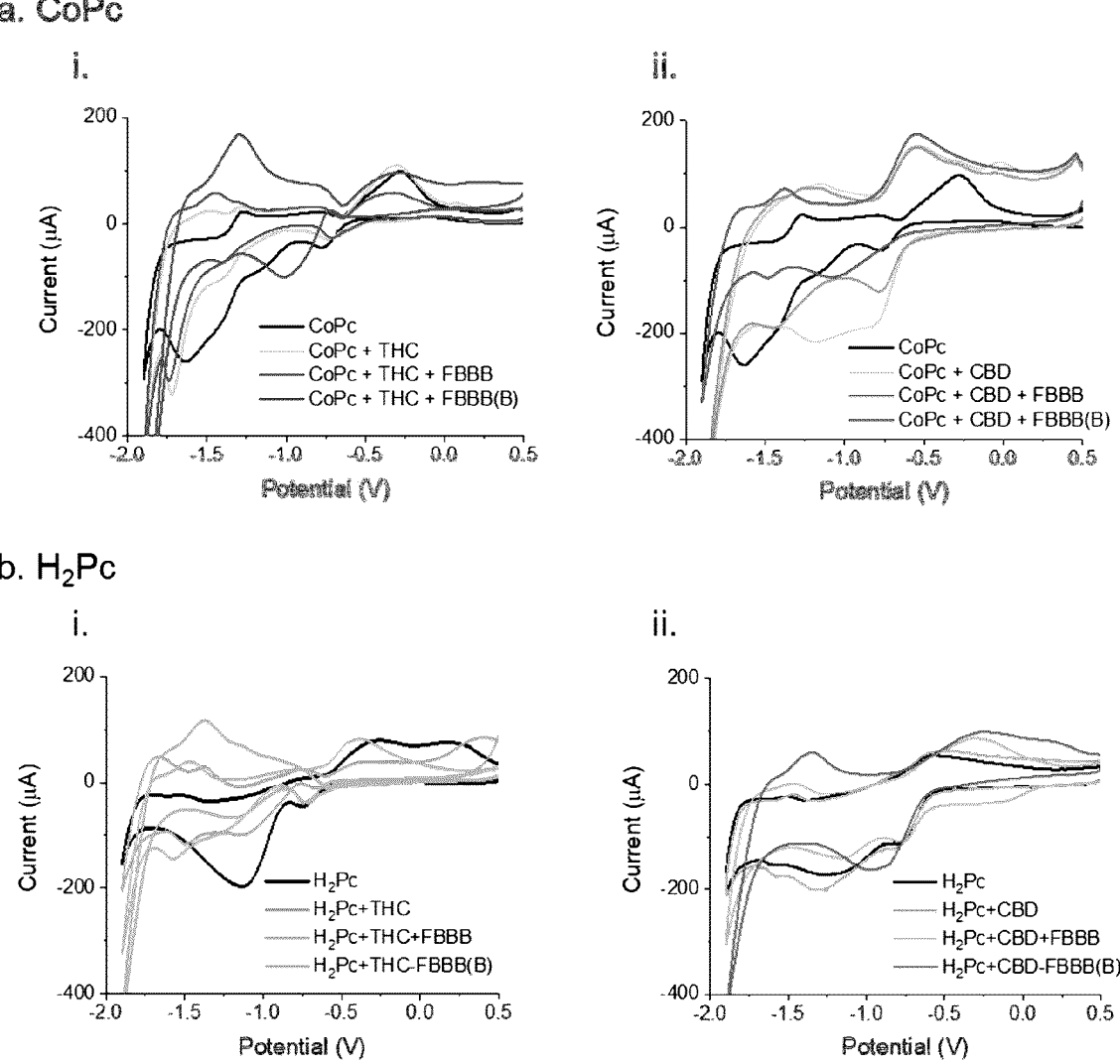
FIG. 13 shows cyclic voltammograms of CoPc and $H_2Pc$ with cannabinoids and a colorimetric binding agent.

The spectroelectrochemical reduction responses of six Pcs were investigated in dimethyl sulfoxide (DMSO) with tetra-butyl ammonium perchlorate (TBAP) electrolyte (FIG. 12). DMSO/TBAP was selected as a solvent/electrolyte system as it has a relatively wide negative potential window, and all analytes utilized are soluble to 0.1 µM. The reducing potential applied to each of the Pcs corresponded to the first reduction potential as indicated by in situ cyclic voltammetry (CV) (FIG. 13). Spectroscopically, $H_2Pc$ and tbt-CuPc (FIG. 12 a, b) were characterized by having broad peaks with limited features which is typical of the Pc aggregation. CoPc and FePc (FIG. 12 c, d) have more well-defined spectra, each with clear peaks in both the B band and Q band regions, though still display broad features. ts-CuPc and AlClPc (FIG. 12 e, f), the most electronegative of the Pcs studied, appear highly monomeric with narrow, well-defined B and Q band peaks. For all Pcs studied herein, an increase in peak intensity is observed at the primary Q band peak with a negative applied cell potential, which is driven by increased $\pi \rightarrow \pi^*$ transitions.

While applying a reducing potential of −0.70 V, the spectra of $H_2Pc$ (FIG. 12a) shifts significantly, with the spectra becoming more defined, developing a strong, narrow Q band peak at 671 nm. A pair of split peaks visible at 607 and 639 nm indicate the reduced species is preferentially monomeric in DMSO/TBAP, adopting D4 h symmetry, suggesting coordination with either the solvent or electrolyte. tbt-CuPc displays complex spectra (FIG. 12b), with a Q band peak shoulder at 702 nm and broad background absorbance suggesting the presence of complex aggregates. The main 668 nm Q band peak gains intensity and shifts to 673 nm upon reduction without a significant decrease in background absorbance, implying the aggregating species are closely coordinated. When applying a reducing potential to CoPc (FIG. 12c), a new peak at 702 nm was observed and this was unique to the reduced cobalt species. In addition, the main Q band peak at 664 nm shifts to 660 nm, suggesting metal-ligand interactions and an increased preference towards face-on Pc-Pc coordination (FIG. 12c). Finally, the formation of peaks at 422 nm and 466 nm, corresponding to metal-ligand interactions, further corroborates reduction-driven face-on Pc-Pc interactions. A similar double peak is observed at 394 and 432 nm for FePc (FIG. 12d). However, these interactions are obscured by the B band as they are blue-shifted relative to those of CoPc, implying a slightly lower degree of coordination and less significant $\pi$ electron sharing. This shift is accompanied by a stronger increase in Q band absorbance, demonstrating a different Pc-Pc coordination configuration allowing for a greater degree of $\pi$to $\pi^*$ transitions (FIG. 12d). ts-CuPc (FIG. 12e), with its electronegative tetra-sulfonic acid groups promoting solubility and hindering aggregate formation, evidenced through a strong, narrow, 678 nm Q band peak and two split peaks at 610 and 644 nm, appear monomeric. AlClPc appears highly monomeric with a strong Q band at 679 nm and well-defined split peaks at 612 and 646 nm respectively (FIG. 12f). These spectral features are supported by the limited ability of AlClPc to form additional metal ligand interactions due to its flexed ring shape via axially substituted chlorine. Overall, the results obtained regarding the spectroelectrochemical behavior of Pcs provide a response baseline for each Pc that can be compared to the more complex multi-component systems required for analyte sensing.

For clarity, FIG. 12 shows absorbance spectral baseline (black) and reducing potential responses at 100 s, 200 s, and 300 s from initial voltage application (coloured) of 0.1 µM for: (a) metal-free phthalocyanine ($H_2Pc$), (b) 4,4',4"4'"-tetra-tert-butyl CuPc (tbt-CuPc), (c) cobalt phthalocyanine (CoPc), (d) iron phthalocyanine (FePc), (e) 3,4', 4", 4'"-tetrasulfonic-acid CuPc (ts-CuPc), and (f) aluminum chloride phthalocyanine (AlClPc) in DMSO with 0.1 M TBAP electrolyte in a custom quartz SEC cell. The first reducing potential by in situ CV ((a) −0.70 V, (b) −0.75 V, (c) −0.55 V, (d) −0.40 V, (e) −0.74 V, (f) −0.50 V) was applied between the platinum micromesh working electrode and platinum wire counter electrode against an Ag/AgCl reference electrode.

It should be noted that FIG. 13 shows cyclic voltammograms of CoPc and $H_2Pc$ with cannabinoids and a colorimetric binding agent. For FIG. 13, a scan rate of 0.1 mV/s was applied between a platinum micromesh working electrode and platinum wire counter electrode against an Ag/AgCl reference electrode and data collected on a VersaSTAT 3 potentiostat.

Reduction Processes of $H_2Pc$ in the Presence of Cannabinoids

To assay the effects of cannabinoids on the spectroelectrochemical behavior of Pcs, specifically interactions with the Pc macrocycle, equimolar amounts of cannabinoid, either THC or CBD were added to a solution containing $H_2Pc$. The cell was then exposed to the first reducing potential of the Pc as defined by CV and used to generate spectroelectrochemical baselines as was done previously for the free Pcs (FIG. 14a, b). Prior to the application of bias, the addition of THC does not substantially alter the spectrum relative to baseline (FIG. 14a, black line), however the addition of CBD slightly promotes the monomeric species of the Pc (FIG. 14b, black line), possibly through a pseudo-reducing effect, visualized through sharper peaks and an increase in peak intensity at 671 nm. Upon the application of bias, an increase in absorbance of the 671 Q band peak, the secondary peak at 619 nm and formation and increase of two B band peaks at 324 and 383 nm is observed for $H_2Pc$ with both cannabinoids, with a limited reduction in light scattering effects (FIG. 14a, b). This result suggests that the cannabinoids are not donating electrons directly to $H_2Pc$, but instead are coordinating strongly, increasing electron density of the Pc ring and promoting $\pi \rightarrow \pi^*$ transitions. Such spectral responses have previously been attributed to slight increases in the HOMO level of $H_2Pc$. DFT and QSAR studies of THC and CBD suggest that the electron density of CBD is spatially confined around carbons 8, 9, and 10, localizing electron density relative to THC, supporting the differences in spectroelectrochemical behavior observed. The cyclic voltammogram of $H_2Pc$+CBD corroborates this behavior (FIG. 14c, green), with the reducing potential peaks shifting by approximately −0.28 V and the current increasing relative to $H_2Pc$+THC, suggesting a smaller diffusion layer and less aggregate formation.

With equimolar $H_2Pc$, cannabinoid, and FBBB added to the sample solution, analysis under conditions that do not promote the formation of an FBBB-cannabinoid complex (i.e. neutral pH), a reduction in intensity of the baseline 671 nm Q band peak is observed relative to both those for the free $H_2Pc$ and equimolar $H_2Pc$, cannabinoid solutions (FIG. 14d, e, black line). Upon application of bias, increases in the intensity of the Q and B band peaks is observed similarly to the spectral changes noted upon cannabinoid addition alone, however light scattering increases slightly suggesting aggregate formation persists or increases. Upon addition of FBBB under alkaline conditions, which is known to covalently bind to cannabinoids at their phenol moiety, and before the application of bias, the UV-Vis spectrum of $H_2Pc$ appears strongly monomeric (FIG. 14g, h, black line). This implies that the cannabinoid-FBBB conjugate promotes $H_2Pc$ coordination with the solvent or electrolyte resulting in strongly favored D4h symmetry. With an applied reducing bias, the THC-FBBB conjugate with $H_2Pc$ prompts an increase in light scattering and a 6 nm red-shift of the main Q band peak, implying the preference of an edge on species that can aggregate upon reduction. Neither an increase in background absorbance nor peak shifts is observed for the reduction of $H_2Pc$ in the presence of the CBD+FBBB(B) conjugate (FIG. 14h), indicating preference to a differently orientated coordinated species which does not aggregate as readily.

Figure 14:
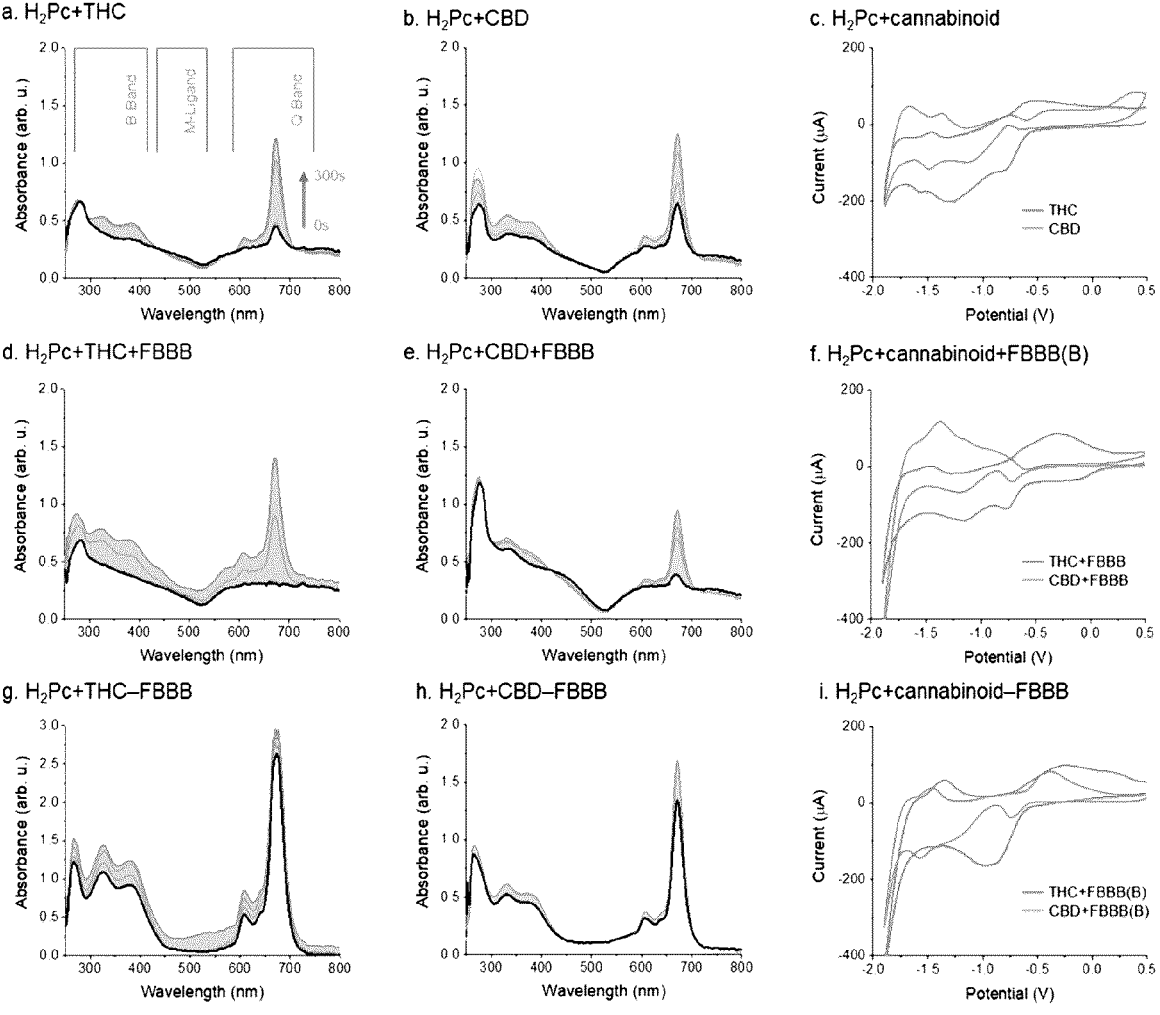
FIG. 14 shows spectroelectrochemical reduction processes and cyclic voltammograms of $H_2Pc$ with cannabinoids, cannabinoids and FBBB (neutral pH), and cannabinoid-FBBB conjugate (high pH).

Consistent with the spectra (FIG. 14 d,e vs. g,h), cyclic voltammograms of $H_2Pc$+CBD and $H_2Pc$+CBD+FBBB show negatively shifted peaks (−0.28 V and −0.15 V respectively) corresponding to the first order reduction process relative to those of THC and THC+FBBB (FIG. 14f, i). With the $H_2Pc$+CBD-FBBB(B) sample, there is a limited shift but instead a substantial increase in the first reduction potential intensity (FIG. 14i, green), while THC+FBBB(B) shows an increased negative potential shift (FIG. 14i, orange). This further demonstrates that while both cannabinoid conjugates are coordinating with the Pc ring, they are doing so differently, and that these changes are reflected in both their spectral and electrical properties.

It should be clear that FIG. 14 shows absorbance spectral baseline (black) and reducing potential responses at 100 s, 200 s, and 300 s from initial voltage application (coloured) of 0.1 µM $H_2Pc$ in DMSO with 0.1 M TBAP electrolyte in a custom quartz SEC cell following equimolar additions of: (a, b, c) THC or CBD, (d, e, f) FBBB, (g, h, i) 50 µM NaOH. The first reducing potential by in-situ CV ((a) −1.1 V, (d) −0.75 V, (g) −0.85 V, (b) −0.75 V, (e) −0.75 V, (h) -0.80 V) was applied between the platinum micromesh working electrode and platinum wire counter electrode against an Ag/AgCl reference electrode. A scan rate of 0.1 mV/s was applied.

Reduction Processes of CoPc in the Presence of Cannabinoids

CoPc is similar in size and molecular properties to CuPc, but, unlike CuPc, CoPc is soluble in mild solvents and amenable to spectroelectrochemical analysis. Initially, the effect of adding equimolar concentration of THC or CBD to CoPc was studied under a negative bias (FIG. 15a, b). With the addition of THC, the Q band intensity increased relative to the baseline CoPc spectra (FIG. 15a, black line). Conversely, the addition of CBD reduced the intensity of the Q and B relative to the baseline CoPc spectra (FIG. 15b, black line). In the presence of either cannabinoid, a similar shift in the Q band from 664 nm to 661 nm was observed, implying face-on Pc-ligand coordination. In the presence of THC and upon the application of bias, the CoPc Q band shifts back to 664 nm, becoming less intense and slightly broader (FIG. 15a). Metal-ligand peaks at 422 and 466 nm also develop, and a broad shoulder at 702 nm appears, corresponding to the reduced cobalt species (FIG. 15a). This shoulder is of reduced intensity relative to the shoulder that appears upon application of bias to CoPc alone (FIG. 15c). The Q band intensity increase observed in the CoPc-THC sample suggests that interactions between the Pc ring and THC provides a pseudo-electron donating effect, hindering the ability for Pc-Pc coordination. Upon reduction, the electron donating effect is lessened but the hindrance towards metal coordination persists (FIG. 15a). In the presence of CBD and upon application of bias, the CoPc Q band peak decreases in intensity but does not shift, and the shoulder at 702 nm appears (FIG. 15b). Unlike what was observed in the presence of THC, the shoulder at 702 nm appears unaltered by the presence of CBD. The B band at 380 nm significantly increases in intensity upon reduction, suggesting a unique interaction between CoPc and CBD limiting S0 to S1 transitions. Additionally, both the metal-ligand coordination peaks red-shift by 4 nm to 426 and 470 nm, and a third peak at 445 nm develops. With the appearance of a new metal-ligand peak and considering the higher electron density of CBD, CBD could interact more directly with the central cobalt, drawing electronegativity away from the CoPc macrocycle to cause the overall observed spectral intensity decrease. Such an interaction is further supported by the CV curves, which show higher current at both the first and second reducing potentials, relative to THC, as well as −0.11 and −0.10 V shifts respectively (FIG. 15c, purple).

In the presence of neutral FBBB and either cannabinoid before applied potential, metal-ligand coordination is observed (FIG. 15d, e). Increasing intensity of the CoPc Q band peak is observed with the addition of THC and FBBB, which is accompanied by a 3 nm red shift to 668 nm (FIG. 15d). Upon reduction, Q band intensity decreases slightly with a similarly slight 2 nm blue shift to 666 nm, a minor increase in the intensity of the 422 and 466 metal-ligand coordination peaks, and a reduction in the 702 nm cobalt peak. With the addition of CBD and neutral FBBB (FIG. 15e), overall spectral intensity increases, pointing to the formation of aggregate species, and a spectral shift in the Q band region is observed where the predominant Q band peak becomes that of the reduced cobalt at 702 nm. Both the original Q band peak and split peak are still visible, but red shifted to 669 and 634 nm, respectively. A reducing potential increases absorbance across the whole spectrum, pointing towards the promotion of aggregation. By CV, similar differences in the interaction of THC and CBD alone with CoPc were noted in the presence of neutral FBBB (FIG. 15f): specifically, higher reducing current when CBD is present relative to THC, possibly through a smaller diffusion layer due to a lesser propensity towards aggregate formation.

Upon interaction with the THC-FBBB(B) conjugate, CoPc demonstrates high background absorbance, persistent metal-ligand coordination, and the 702 nm shoulder becomes more intense than the Q band peak which shifts from 664 to 669 nm (FIG. 15c, black line). These data demonstrate preference of the reduced cobalt form in the presence of THC-FBBB(B), possibly through aggregate formation. However, interaction of CoPc with the CBD+FBBB(B) conjugate causes the most predominant Q band peak to appear at 660 nm, which loses intensity and red-shifts to 663 nm with the application of reducing potential (FIG. 15f). Furthermore, the 702 nm shoulder and 422/466 nm metal coordination peaks are initially present and gain in intensity with reducing potential. Thus, the CBD+FBBB(B) conjugate also appears to coordinate with the central metal, however the CBD-FBBB(B) conjugate has less of a reducing effect on the CoPc than the THC+FBBB(B) conjugate. By CV, the addition of the CBD-FBBB(B) conjugate to CoPc produces a similar current as the THC-FBBB(B) conjugate (FIG. 15i), however the THC-FBBB(B) conjugate demonstrates a high potential as the second reduction state is reversibly oxidized, suggesting a unique interaction between CoPc and the THC-FBBB(B) conjugate. The spectroelectrochemical differences indicative of coordinating activity between the two cannabinoids with and without FBBB is significantly more pronounced with CoPc over $H_2Pc$, suggesting that the central metal plays a key role in facilitating Pc-ligand interactions.

Figure 15:
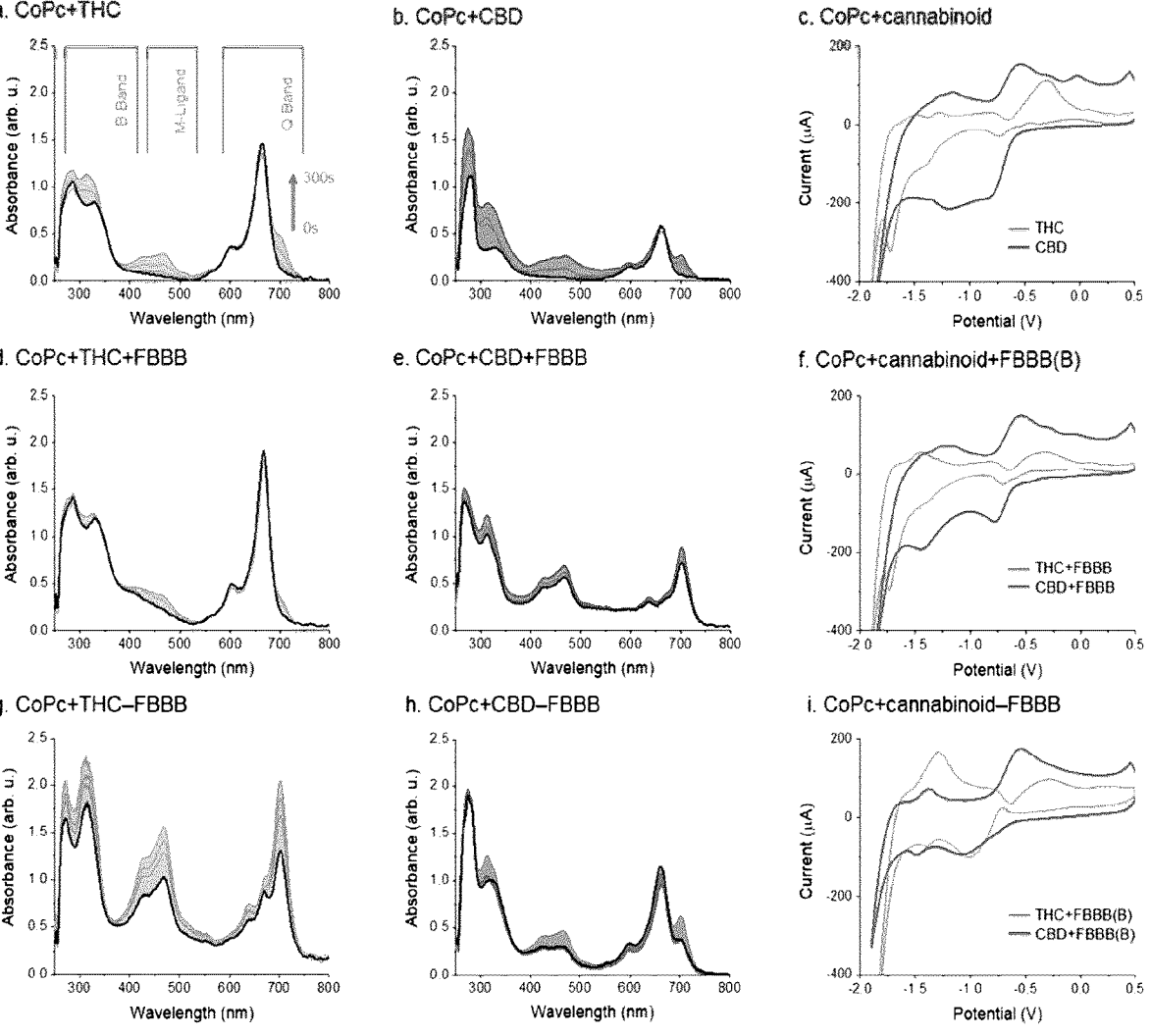
FIG. 15 shows spectroelectrochemical reduction processes and cyclic voltammograms of CoPc with cannabinoids, FBBB, and cannabinoid-FBBB conjugate.

As can be seen, FIG. 15 shows absorbance spectral baseline (black) and first reducing potential responses at 100 s, 200 s, and 300 s (coloured) of 0.1 μM CoPc in DMSO with 0.1 M TBAP electrolyte in a custom quartz SEC cell following equimolar additions of: (a, b, c) THC or CBD, (d, e, f) FBBB, (g, h, i) 50 μM NaOH. The first reducing potential by in-situ CV ((a) −1.1 V, (d) −0.75 V, (g) −0.85 V, (b) −0.75 V, (e) −0.75 V, (h) −0.80 V) was applied between the platinum micromesh working electrode and platinum wire counter electrode against an Ag/AgCl reference electrode. A scan rate of 0.1 mV/s was applied.

Reduction Processes of Metal Phthalocyanines in the Presence of THC+FBBB(B)

The discussion below sought to examine the effects of the THC-FBBB(B) conjugate on other metal Pcs in efforts to determine if coordination effects are observed similar to those noted with CoPc. Prior to the application of bias, FePc displays an intensity increase and a Q band peak shift from 659 nm to 654 nm upon interaction with THC-FBBB(B) (FIG. 16*a*, black line). Since $Fe^{II}$ cannot easily be reduced, new Q band peaks are not observed. With an applied reducing potential, the Q band reduces in intensity, red-shifting to 657 nm while apparent metal-ligand coordination increases, visualized as peaks at 395 and 440 nm. Similar effects are observed with the soluble ts-CuPc upon interaction with the THC-FBBB(B) conjugate (FIG. 16*b*): an increase in the 678 nm Q band absorbance is observed before application of bias, which reduces in intensity with applied potential concurrent with the appearance of a 527 nm metal-ligand coordination peak. A large B band increase is observed with the applied reducing bias, potentially pointing towards a unique cannabinoid-Pc interaction, similar to that of CBD with CoPc. Tbt-CuPc is another soluble form of the CuPc core, however possessing bulky tert-butyl substitutions on the diiminoisoindoline moieties. Tbt-CuPc shows substantial spectral shifts from its baseline with the addition of the THC-FBBB(B) conjugate, becoming highly monomeric (FIG. 16*c*), similar to what was observed with $H_2Pc$ (FIG. 14*g*). Steric hindrance of the tert-butyl groups likely limits metal-ligand coordination, supporting the role of metal-ligand interactions in the spectroelectrochemical responses of CoPc, FePc, and ts-CuPc in the presence of cannabinoid-FBBB(B) conjugates.

AlClPc is highly monomeric in solution with a very narrow and intense Q band at 678 nm, and two split peaks at 646 and 612 nm (FIG. 16*d*). In the presence of the THC-FBBB(B) conjugate, a 14 nm blue-shift of the main Q band to 664 nm is observed alongside a reduction of intensity. The vibrational split peaks become further separated from the main Q band peak, each blue-shifting 12 nm to 634 nm and 600 nm, respectively. With the application of reducing potential, the 664 nm Q band peak becomes less intense and a small metal coordination peak appears at 435 nm with an increase in light scattering. These large Q band peak shifts suggest that AlClPc is significantly altering its coordination states in the presence of the THC-FBB(B) conjugate.

Figure 16:
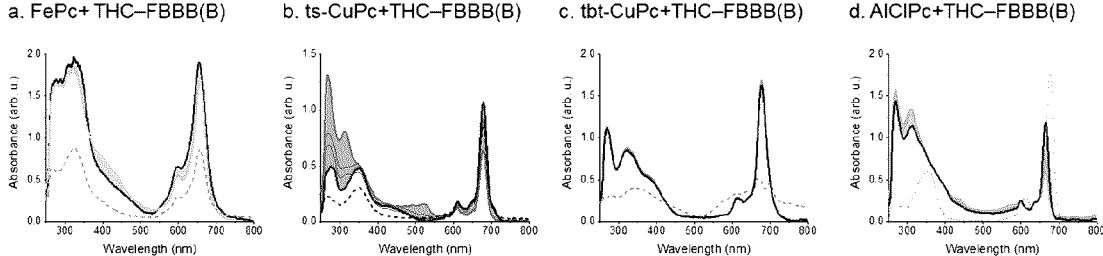
FIG. 16 shows spectroelectrochemical reduction processes of phthalocyanines with THC-FBBB(B) conjugate.

It can thus be seen that FIG. 16 shows absorbance spectral baseline of Pc only (dashed line), treated spectral baseline (black) and first reducing potential responses at 100 s, 200 s, and 300 s (coloured) of 0.1 μM (a) FePc, (b) ts-CuPc, (c) tbt-CuPc (d) AlClPc in DMSO with 0.1 M TBAP electrolyte in a custom quartz SEC cell following equimolar additions THC and FBBB with 50 μM NaOH. The first reducing potential by in-situ CV ((a) −1.2 V, (b) −0.50 V, (c) −0.75 V, (d) −0.75 V) was applied between the platinum micromesh working electrode and platinum wire counter electrode against an Ag/AgCl reference electrode.

THC and THC-FBBB coordination with AlClPc

Figure 17:
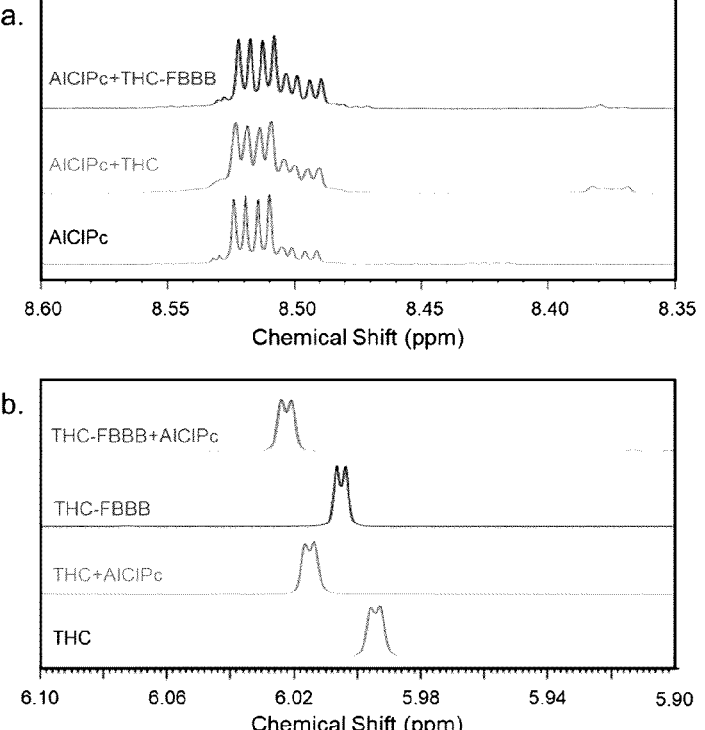
FIG. 17 illustrates $^1$H-NMR traces of AlClPc, THC, the THC-FBBB(B) conjugate, and AlClPc with THC or the THC-FBBB(B) conjugate with: (a) centered at 8.45 ppm, (b) centered at 6.00 ppm (3' THC proton)
Figure 18:
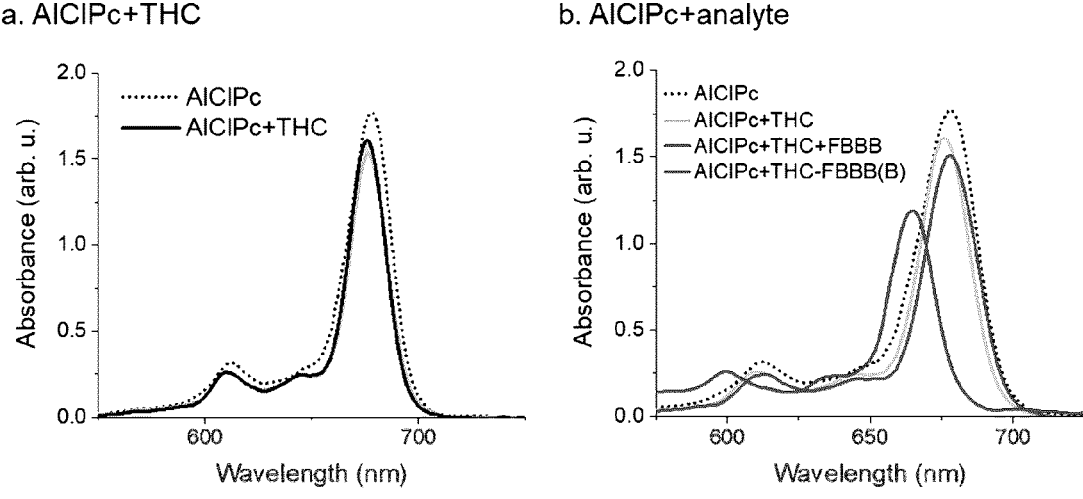
FIG. 18 shows Q band absorbance of the spectroelectrochemical reduction of AlClPc+THC and UV-Vis spectra of AlClPc with analytes.
Figure 20:
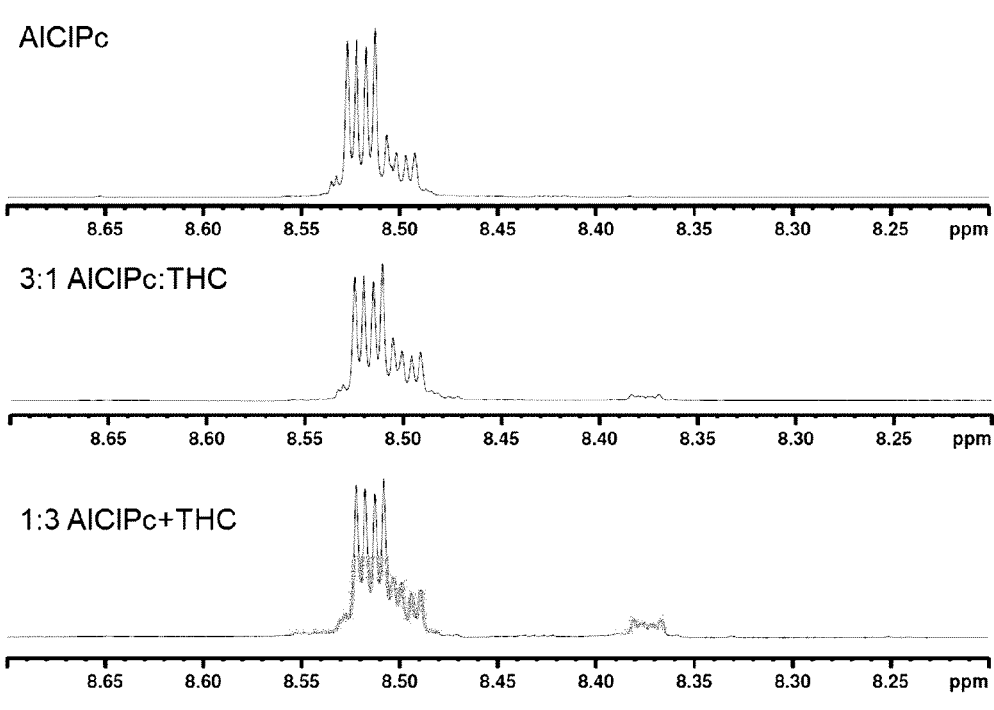
FIG. 20 shows $^1$H-NMR traces of R2,3 protons of AlClPc with increasing concentrations of THC.
Figure 19:
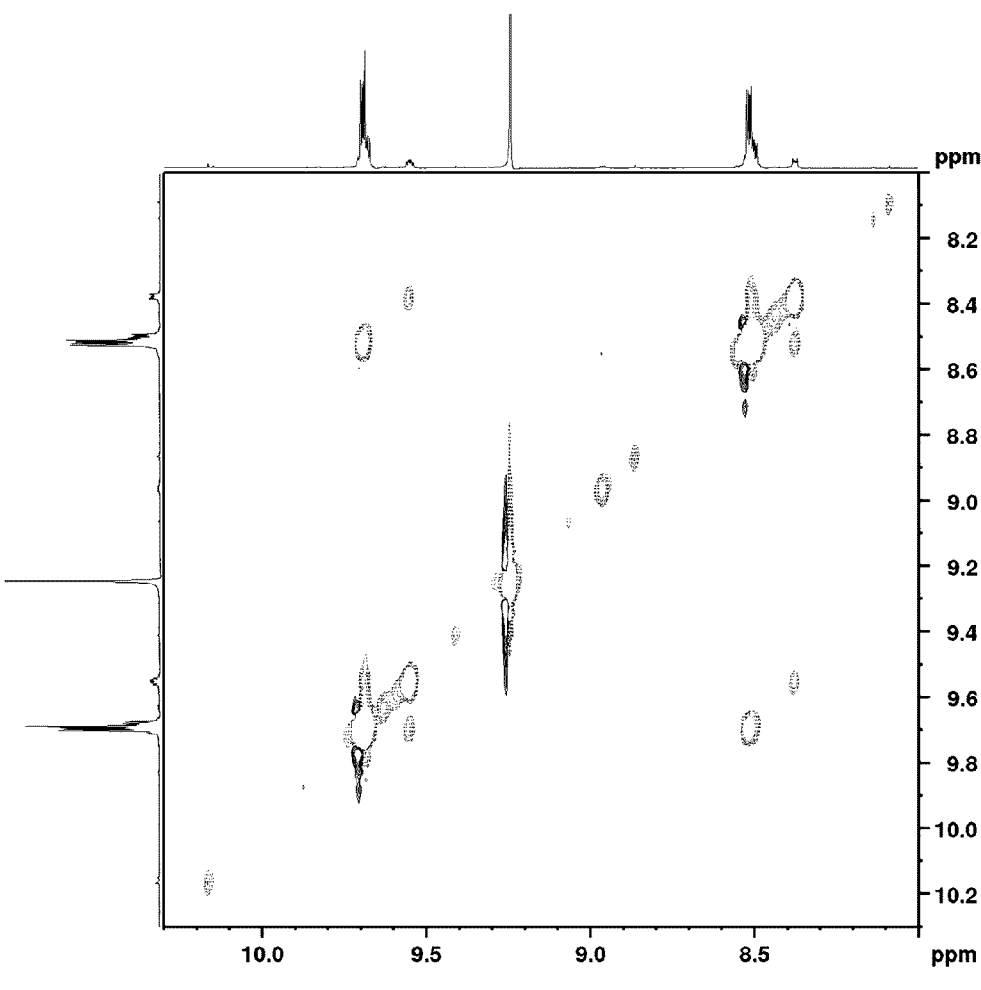
FIG. 19 illustrates partial EXSY spectra of AlClPc+THC.
Figure 21:
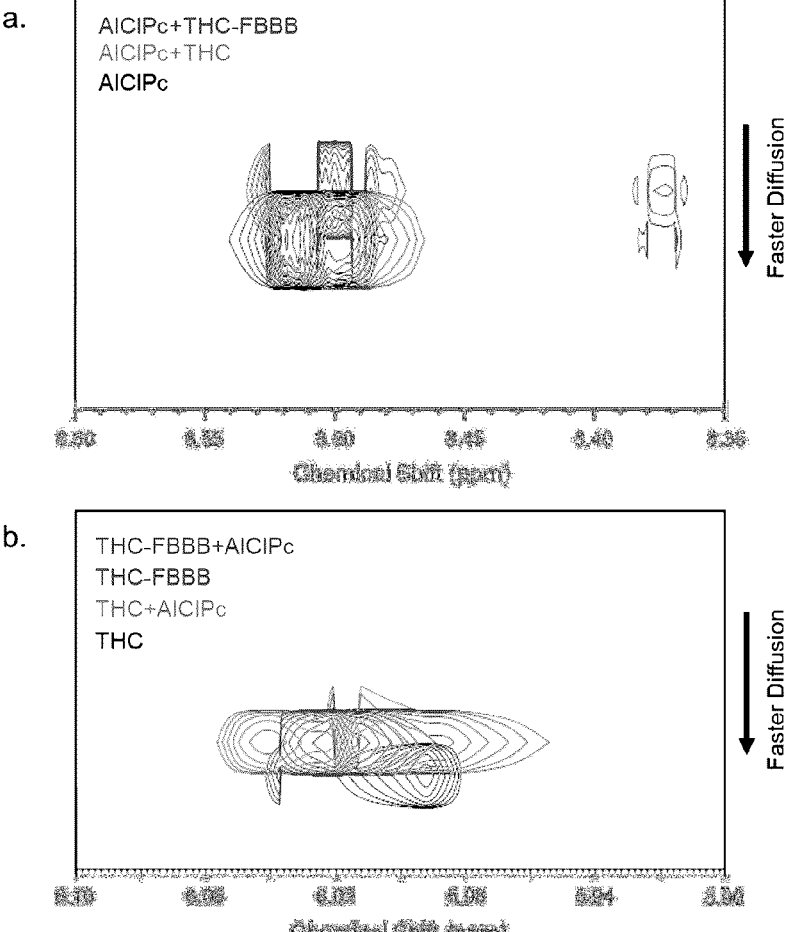
FIG. 21 illustrates DOSY spectra of AlClPc, THC, the THC-FBBB(B) conjugate, and AlClPc with THC or the THC-FBBB(B) conjugate where , in the Figure, (a) is centered at 8.45 ppm and (b) is centered at 6.00 ppm (3' THC proton)

A series of NMR experiments were performed to support and dissect Pc-Pc and Pc-ligand interactions observed from the solution-based spectroelectrochemical screening (FIG. 17). AlClPc was analyzed as it is diamagnetic and its main Q band peak shifts with additions of THC and the THC-FBBB(B) conjugate (FIGS. 16*d* and 18), implying that interactions between the semiconductor and analyte species may be present. The $^1H$ NMR signal for the R2,3 protons of AlClPc, centered at 8.52 ppm, appears as a large doublet of doublets with an adjacent lower frequency doublet of doublets and a high frequency doublet shoulder (FIG. 17*a*), corresponding to different configurations or coordination orientations of AlClPc. These subspectra were shown to be in slow exchange with one another by using NMR exchange spectroscopy (EXSY, FIG. 19). With the addition of THC, a new set of doublet of doublets appears centered at 8.37 ppm, implying strong interaction of THC to AlClPc and resulting in a shielding effect. Increasing concentrations of THC increases the intensity of these new peaks (FIG. 20). Furthermore, on a normalized basis, the smaller set of doublet of doublets at ~8.50 ppm for AlClPc+THC is twice as intense relative to the larger set compared to AlClPc indicating that the configuration of the AlClPc is affected by an interaction with THC (FIG. 17*a*). A diffusion ordered NMR spectroscopy (DOSY) experiment (FIG. 21) also suggests strong coordination of THC with AlClPc. The diffusion constant for the THC in AlClPc+THC is measurably lower than that of THC on its own, indicating an associative interaction between THC and AlClPc (FIG. 21). Additionally, the 3' proton signal of THC in the AlClPc+THC solution shifts to higher frequency by 0.02 ppm compared to THC. Similar shifts are also observed for the 5' and 8 protons on THC again indicating a significant interaction between the THC and the AlClPc. With the addition of the THC-FBBB(B) conjugate, the normalized intensity of the second set of Pc doublets of doublets at 8.50 ppm shifts slightly to lower frequency and appears four times more intense than those of AlC1Pc and twice as intense as those of AlClPc+THC. Only a very small set of doublets of doublets at 8.37 ppm is visible in the 1H-NMR spectra (FIG. 17*a*). The 3' proton of THC is shifted to higher frequency; however, the diffusion coefficient is comparable to that of AlClPc+THC, further demonstrating the level of coordination between those two species.

For FIG. 17, $^1H$-NMR experiments were carried out on a Bruker Avance-IIIHD 600 MHz NMR spectrometer equipped with a cryoprobe using standard one-pulse programs. For FIG. 19, the experiment was carried out on a Bruker Avance-IIIHD 600 MHz spectrometer equipped with a cryoprobe using the standard gradient NOESY/EXSY pulse program with a mixing time of 1 second and a recycle time of 3 seconds. Each of 213 increments were collected with 4 scans. The cross peaks in the spectrum are of the same sign as the diagonal and are due to conformational exchange.

For FIG. 21, DOSY experiments were carried out on a Bruker Avance-IIIHD 600 MHz NMR spectrometer equipped with a cryoprobe using standard simulated echo DOSY pulse programs.

Figure 22:
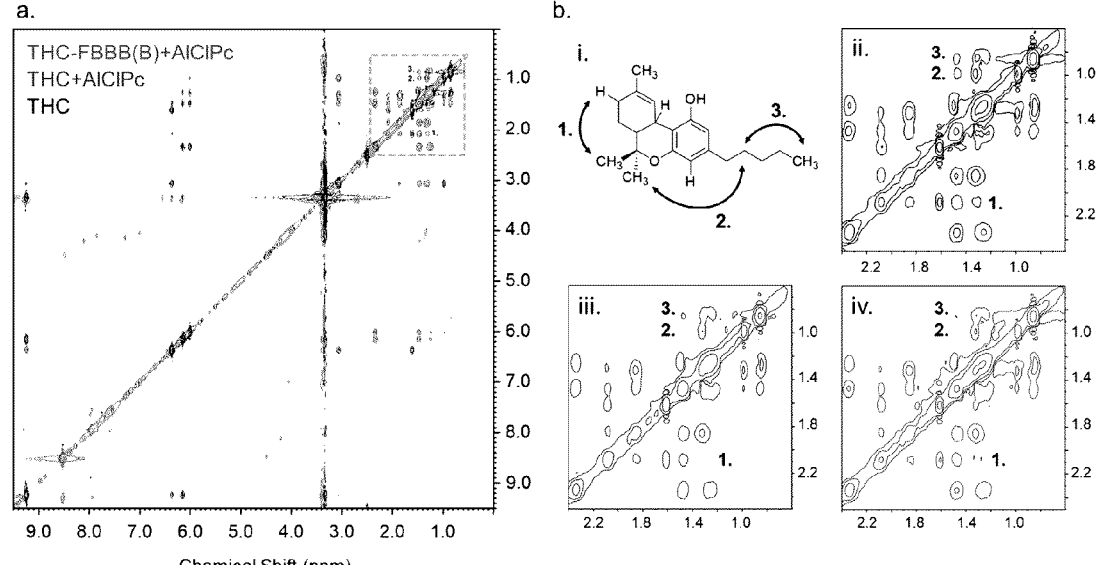
FIG. 22 shows NOESY spectra and assigned proton-proton interactions of THC where: (a) shows Stacked NOESY spectra of THC (black), AlClPc with THC (blue), and AlClPc with the THC-FBBB(B) conjugate (red) and (b) shows: (i) assigned THC proton-proton interactions and inset NOESY data between 0.6 and 2.4 ppm of (ii) THC, (iii) AlClPc with THC, (iv) AlClPc with the THC-FBBB(B) conjugate.

In order to investigate the structural effects of analyte-Pc interactions on cannabinoid conformation, NOESY experiments were performed (FIG. 22). While THC can coordinate strongly with AlClPc, it does not significantly alter the optical spectral data (FIG. 18), showing a limited 3 nm blue-shift. These results imply that the overall electrochemical properties of AlClPc are not significantly altered. Conversely, with the THC-FBBB(B) conjugate, significant AlClPc spectral shifts are observed. Thus, by analyzing the effects of THC and the THC-FBBB(B) conjugate by NMR we can gain additional insight into their coordinating interactions with AlClPc, complementing the spectroelectrochemical analysis. The NOESY spectra show a reduction in intensity at specific cross peaks (FIG. 22, labelled 1., 2., 3.) for both AlClPc and the THC-FBBB conjugate+AlClPc. These spectral changes suggest that in the presence of AlClPc, THC, whether alone or conjugated to FBBB, is more planar in solution. This may be due to intermolecular interactions between the analytes and the semiconductor, further delocalizing the π electron cloud. This corroborates the spectroelectrochemical data, which suggests that adding THC or the THC-FBBB(B) conjugate changes the preference of Pc-Pc configurations, shifting their band gap, and altering the Pcs' electronic properties (FIG. 16d).

In FIG. 22, the green box denotes inset area shown in (b). For FIG. 22, NOESY experiments were performed on a Bruker Avance 11-400 MHz NMR using the standard gradient NOESY pulse programs.

Effect of Analyte Composition and Pc on Device Performance

As noted above, with applied source-drain (VSD) and gate-source (Vas) biases to generate a current ($I_{DS}$), charge can be moved through Pc semiconducting films between the source and the drain at a rate defined by mobility (μ, calculated from Equation (2)). The $V_{GS}$ bias at which current significantly increases is known as the voltage threshold ($V_T$). The effects of THC, FBBB, and the THC-FBBB(B) conjugate on μ and $V_T$ were explored for CuPc (FIGS. 23a) and $F_{16}$-CuPc devices. With the addition of THC or FBBB (B) to CuPc devices, μH, the rate at which holes are transported across the semiconducting layer, decreases by 49 and 53.6% while $V_T$ shifts −9 and −11 V respectively. The subsequent addition of THC to FBBB(B) coated OTFTs causes a 98.9% decrease from the baseline with a −24 V $V_T$ shift from the baseline. With CoPc as the semiconducting material performance changes of μH −23.4, $V_T$+5 V; μH 42.6%, $V_T$−6.2 V; and μH −94.1%, $V_T$−16 V are observed (FIG. 23b) with THC, FBBB(B), and FBBB(B) with the subsequent addition of THC respectively. H2Pc has a high baseline VT of 45 V, shifting by −27 and −30 V and μH decreasing 30.1% and 49.2% with THC and FBBB(B) respectively. H2Pc shifts another −15 V and μH decreasing an additional 34.4% with the subsequent addition of THC.

Figure 23:
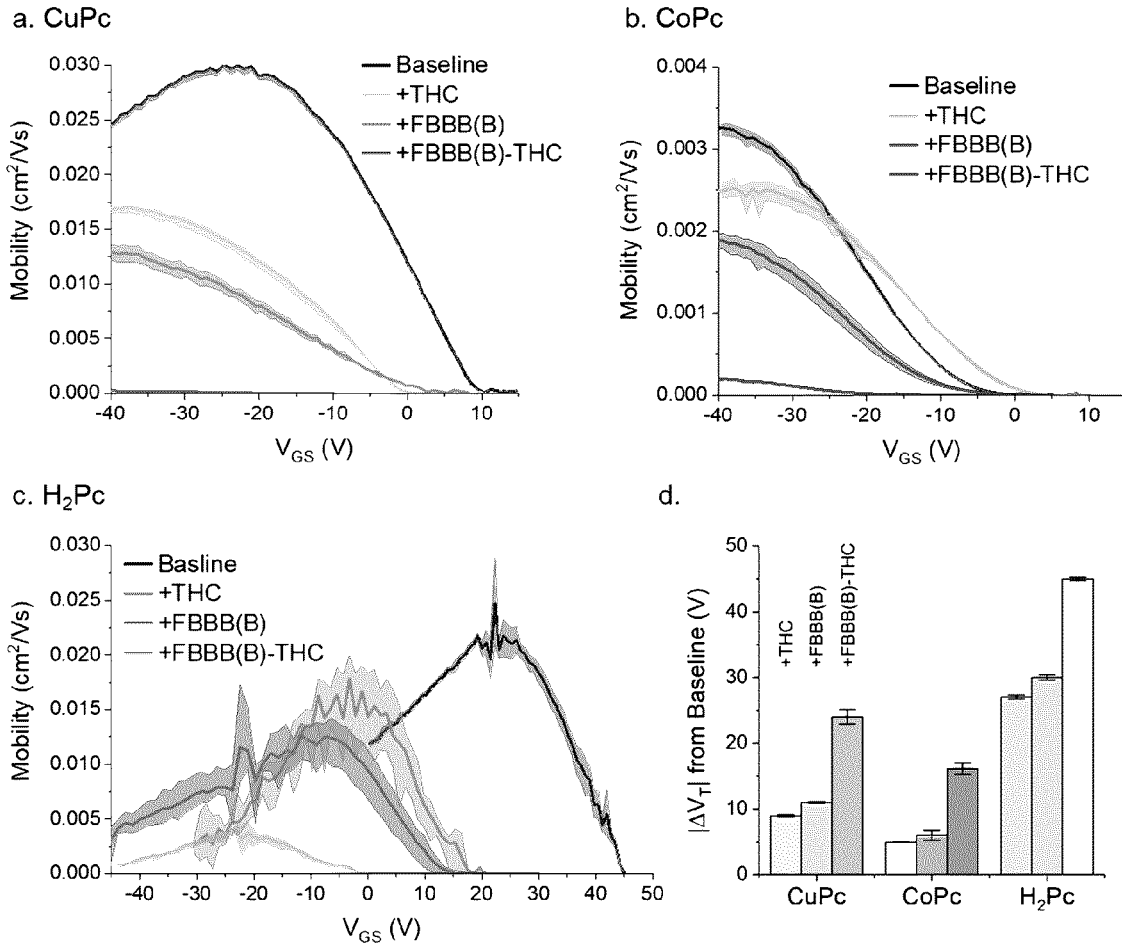
FIG. 23 illustrates the effect of THC on the field-effect mobility of alkaline FBBB-treated OTFTs with respect to gate-source voltage ($V_{GS}$).

For FIG. 23, field-effect mobility was evaluated for OTFTs consisting of native and alkaline FBBB (20 μM)-treated (a) CuPc, (b) CoPc, or (c) $H_2$Pc, semiconductors following the addition of 0.5 uL of 20 μM THC in ACN. Mobility curves represent the mean (solid line) and data range (shaded region) of three $V_{GS}$ sweeps at saturation across four devices. Mobilities were calculated between adjacent points of the transfer data using equation 2. Errors bars are standard deviation.

From the spectroelectrochemical data of $H_2$Pc and CoPc (FIGS. 12 and 14 respectively), it can be inferred that both THC and FBBB interact broadly with the Pc macrocycle, irrespective of the central species, donating electron density to result in the observed increases in Q band intensity. This is reflected in the device data as all three materials display very similar trends. THC results in both moderate mobility decreases and $V_T$ shift while FBBB(B) results in slightly greater mobility decrease and $V_T$ shifts relative to the baseline. The FBBB(B)-THC conjugate results in the greatest spectral Q band changes and likewise promotes a greater change in OTFT performance.

Similar in molecular size, HOMO/LUMO levels, and electrochemical properties, cobalt and copper, and thus CoPc and CuPc, could be expected to coordinate similarly with the THC-FBBB(B) conjugate, forming aggregates and producing the observed similar sensing responses as OTFT devices. Without a central metal, $H_2$Pc becomes highly monomeric in the presence of the THC-FBBB(B) conjugate, with changes in OTFT performance manifesting primarily as a significant −45 V $V_T$ shift through pseudo-doping effects. Thus, the presence of a central metal allows for direct coordinating interactions which could cause the THC-FBBB (B) conjugate to preferentially act as a charge trap or promote a non-charge conducting aggregate Pc species. It could then be inferred that evidence of strong metal-analyte coordination correlates to large mobility decreases through charge trapping effects, while preferential Pc ring-analyte coordination results in $V_T$ shifts by acting as a pseudo-dopant. This implies that, for screening potential materials for OTFT device sensing, specific peak changes to the Q band region, aggregate formation, and signs of preferential M-ligand coordination can be used to guide material selection.

From the above, it should therefore be clear that spectroelectrochemistry can be used as a powerful technique to gain insight into interactions of Pcs with analytes that can be used to predict the degree of sensing response of Pc-based OTFT devices as well as other types and configurations of electrochemical-based devices for sensing cannabinoids. Cannabinoids are shown to coordinate strongly with Pcs in solution with limited alterations to their electrochemical properties. The FBBB(B)-cannabinoid conjugate coordinates less strongly with Pcs, however, it significantly alters their electrochemical properties, with effects varying dependent on bound cannabinoid species. These spectroelectrochemical differences are reflected in the elicited sensing response of OTFT devices. THC and CBD, and their respective FBBB(B) conjugates, are shown to have varying interactions with both $H_2$Pc and CoPc, with improved selectivity in the presence of a central metal and the colorimetric probe. A screen of four additional Pcs (FePc, AlClPc, ts-CuPc, and tbt-CuPc) serves to demonstrate the effects of alterations to the central metal alongside peripheral and axial substitutions. AlClPc was further shown as an example due to its substantial spectral shifts in the presence of analytes, indicating complex interactions and the formation of new coordinated species. $^1$H-NMR, 2D DOSY and NOESY experiments were conducted to further characterize the structural underpinnings of the observed spectroelectrochemical changes, suggesting that analyte-Pc interactions promote analyte planarity and increased π electron delocalization. OTFT devices demonstrate differences in sensing response between $H_2$Pc, CoPc and CuPc through significant variations in device performance upon interaction with THC-FBBB(B). From the above, it should therefore be clear that Pc semiconductors can be used for cannabinoid sensing and provides a straightforward solution-based screening tool for highly selective materials for device sensor integration.

Regarding the specific implementation noted above that involves an OFET, it should be understood that any configuration of OFET (i.e., any configuration that includes a top contact top gate (TCTG), a top contact bottom gate (TCBG), a bottom contact top gate (BCTG) and a bottom contact bottom gate (BCBG)) may be used to form such an implementation of this aspect of the present invention. Likewise, the probe (or a suitable molecular sensor material) may be blended into the semiconductor layer and such that cannabinoids may diffuse to the electrical interface. It should be understood that even in the BGBC configuration, the cannabinoids may need to diffuse to the dielectric/semiconductor interface. Accordingly, the present invention may include TCBG, TCTG and BCBG as well as vertically integrated OFETs, floating gate OFETs, electrolyte gated OFET (EGOFET), and ion sensitive OFETs (ISFET).

It should also be understood that in other exemplary embodiments, the device of the present invention may be provided in the form of a chemiresistor, i.e. a device without a dielectric and a gate layer. In a similar manner as previously described, the source and drain electrode are provided with a material layer therebetween, and the flow of current across the electrodes is measured. The material layer could be a semiconducting material, a conducting material, or an insulating material and can act as a sensor element as noted above. The material may be treated with a probe or a suitable molecular sensor material according to the present disclosure. Methods according to the present invention may thus be conducted in a similar manner using a chemiresistor or any suitable electrochemical device as the electrochemical sensor. Methods according to the present invention may further be conducted in a similar manner using a potentiometric sensor, voltammetric sensor, amperometric sensor or impedimetric sensor, as well as spectroelectrochemical sensors based on, for example, UV/V as absorption spectroelectrochemistry or Raman spectroelectrochemistry. As noted above, one aspect of the present invention includes the system as defined above and includes any device that implements a sensor element that, when in contact with a cannabinoid, changes its electrochemical properties.

It should be clear that the probe, semiconductor material and cannabinoid could be detected by any type of electrochemical transducer, types of cells, and with other types of electrodes that can be used to convert the electrochemical changes in the phthalocyanine/fbbb-cannabinoid interactions into an electrical signal. Nuclear magnetic resonance (NMR) techniques may achieve detection as well, as shown above.

A person understanding this invention may now conceive of alternative structures and embodiments or variations of the above all of which are intended to fall within the scope of the invention as defined in the claims that follow.

We claim:

1. A system for determining a presence of a substance in a sample, the system comprising:
  a first electrical circuit element;
  a second electrical circuit element;
  a sensor element between said first electrical circuit element and said second electrical circuit element, said sensor element being for contacting said sample, and said sensor element comprising at least one of: CuPc, $F_{16}$CuPc, FePc, AlClPc, ts-CuPc, $H_2$Pc, CoPc, or tbt-CuPc;
  a probe layer comprising an alkaline solution of a diazonium salt, said probe layer being a sensitizing agent;

wherein said sensor element is treated with said probe layer such that said sensor element is sensitized to cannabinoids in said sample; and
  wherein interactions between said sensor element, said probe layer, and said substance in said sample affect at least one electrochemical property of said sensor element,
  wherein said substance is a cannabinoid,
  and wherein said first electrical circuit element, said second electrical circuit element, and said sensor element form an OFET circuit formed within an integrated circuit.

2. The system according to claim 1, wherein said substance is at least one of: THC, THCa, CBD, CBDa, and mixtures thereof.

3. The system according to claim 1, wherein said sensor element comprises a semiconductor and wherein said at least one electrochemical property affects a signal path between said first electrical circuit element and said second electrical circuit element.

4. The system according to claim 1, wherein said electrochemical property affects an impedance between said first electrical circuit element and said second electrical circuit element.

5. The system according to claim 1, wherein said electrochemical property affects a capacitance between said first electrical circuit element and said second electrical circuit element.

6. The system according to claim 1, wherein said system is used in at least one of:
  a voltammetric sensor;
  a spectroelectrochemical sensor;
  an amperometric sensor;
  a potentiometric sensor;
  an impedimetric sensor; and
  a resistive sensor.

7. The system according to claim 1, wherein said system is integrated into a user device that is at least one of: a wearable badge, a wall-mounted device, a built-in device for containers, a built-in device for vessels, a consumer vaping device, a consumer vaping accessory, a filter, and a fillable cigarette.

8. The system according to claim 1, wherein said diazonium salt comprises at least one of: 4-amino-2,5-diethoxy-benzanilide diazotated zinc double salt (Fast Blue BB), o-dianisidine bis(diazotized) zinc double salt, (Fast Blue B) and 4-(4-diazonio-3-methoxyphenyl)-2-methoxybenzenediazonium dichloride (Fast Blue).

9. The system according to claim 1, wherein the system comprises
  a gate layer;
  a dielectric layer;
  a source electrode, a drain electrode and an organic semiconducting layer, wherein the organic semiconductor layer is provided between the source electrode and the drain electrode for providing a signal pathway therebetween;
  wherein
  said source electrode is said first electrical circuit element;
  said drain electrode is said second electrical circuit element; and
  said organic semiconductor layer is said sensor element.

10. The system according to claim 1, wherein said probe layer comprises 4-amino-2,5-diethoxybenzanilide diazotated zinc double salt (Fast Blue BB) and said sensor element comprises one of: CuPc and $F_{16}$CuPc.

11. A device for detecting at least one substance in a sample, the device comprising:

an electrochemical sensor comprising;

a gate layer;

a dielectric layer;

a source electrode, a drain electrode and an organic semiconducting layer, wherein the organic semiconductor layer is provided between the source electrode and the drain electrode for providing a current pathway therebetween;

wherein the organic semiconducting layer is modified with a probe, said probe being a sensitizing agent, such that said organic semiconducting layer is sensitized to cannabinoids in said sample, and wherein said organic semiconductor layer comprises at least one of: CuPc, $F_{16}$CuPc, FePc, AlClPc, ts-CuPc, $H_2$Pc, CoPc, or tbt-CuPc;

a voltage source electrically coupled to the gate layer and the source electrode; and processing means for measuring current flow and detecting a current level indicative of a presence of said substance and/or levels thereof in the sample, wherein said substance is a cannabinoid, wherein said probe comprises an alkaline solution of a diazonium salt, wherein interactions between said organic semiconducting layer, said probe, and said substance in said sample affects at least one electrochemical property of said organic semiconducting layer, and wherein said source electrode, said drain electrode, and said organic semiconducting layer form an OFET circuit formed within an integrated circuit.

12. A method for determining a presence of a cannabinoid in a sample, the method comprising:

a) contacting said sample with a sensor element;

b) measuring an analog signal, said analog signal being indicative of one or more electrochemical properties of said sensor element;

c) determining that at least one cannabinoid is present in said sample if said analog signal indicates a change in said electrochemical properties of said sensor element;

wherein said sensor element is treated with a probe layer prior to step a) to thereby sensitize said sensor element to cannabinoids in said sample;

wherein said probe layer comprises an alkaline solution of a diazonium salt;

wherein, when said cannabinoid is in contact with said sensor element, said electrochemical properties of said sensor element are affected by interactions between said cannabinoid, said probe, and said sensor element, and wherein said sensor element comprises at least one of: CuPc, $F_{16}$CuPc, FePc, AlClPc, ts-CuPc, $H_2$Pc, CoPc, or tbt-CuPc.

13. The method according to claim 12, wherein at least one cannabinoid is at least one of: THC, THCa, CBD, CBDa, and mixtures thereof.

14. The method according to claim 12, wherein said change in said electrochemical properties of said sensor element affects a signal path between circuit elements in a device producing said analog signal, said analog signal being related to said signal path.

15. The method according to claim 12, wherein said said change in said electrochemical properties of said sensor element affects an impedance between circuit elements in a device producing said analog signal, said impedance being related to said analog signal.

16. The method according to claim 12, wherein said electrochemical property affects a capacitance between circuit elements in a device producing said analog signal, said capacitance being related to said analog signal.

17. The method according to claim 12, wherein said probe layer comprises at least one of: 4-amino-2,5-diethoxybenzanilide diazotated zinc double salt (Fast Blue BB), o-dianisidine bis(diazotized) zinc double salt, (Fast Blue B) and 4-(4-diazonio-3-methoxyphenyl)-2-methoxybenzenediazonium dichloride (Fast Blue).

18. The method according to claim 12, wherein said method is implemented in association with a user device that is at least one of: a wearable badge, a wall-mounted device, a built-in device for containers, a built-in device for vessels, a consumer vaping device, a consumer vaping accessory, a filter, and a fillable cigarette.

\* \* \* \* \*